(12) United States Patent  
Baughman et al.

(10) Patent No.: US 8,838,510 B2  
(45) Date of Patent: Sep. 16, 2014

(54) CHOOSING PATTERN RECOGNITION ALGORITHMS AND DATA FEATURES USING A GENETIC ALGORITHM

(75) Inventors: Aaron K. Baughman, Silver Spring, MD (US); Michael Perlitz, Ashburn, VA (US); Stefan A. G. Van Der Stockt, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/234,234

(22) Filed: Sep. 16, 2011

(65) Prior Publication Data

US 2013/0073490 A1    Mar. 21, 2013

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
None
See application file for complete search history.

(56) References Cited

U.S. PATENT DOCUMENTS 6,327,582 B1    12/2001    Worzel
7,047,169 B2    5/2006    Pelikan et al.
2005/0060391 A1    3/2005    Kaminsky et al.
2005/0209982 A1    9/2005    Jin et al.
2009/0313191 A1    12/2009    Yao et al.
2010/0169234 A1*   7/2010    Metzger et al. ................ 705/348

OTHER PUBLICATIONS

Schultz & Grefenstette "Using a Genetic Algorithm to Learn Behaviors for Autonomous Vehicles", AIAA Guidance, Navigation and Control, 1992, pp. 12.*
JGAL, http://web.archive.org/web/20090731145101/http://jgal.sourceforge.net/ , 2009, pp. 2.*
Obitko, http://web.archive.org/web/20090501232753/http://www.obitko.com/http://web.archive.org/web/20090501232753/http://www.obitko.com/tutorials/genetic-algorithms/encoding.php, 2009, pp. 2,.*

* cited by examiner

*Primary Examiner* — Li-Wu Chang
(74) *Attorney, Agent, or Firm* — Douglas A. Lashmit; Hoffman Warnick LLC

(57) ABSTRACT

A system, method and program product for selecting an algorithm and feature set to solve a problem. A perpetual analytics system is disclosed that provides a genetic algorithm for jointly selecting an algorithm and feature set to solve a problem, comprising: an evolutionary computing engine for processing data encoded as chromosomes, wherein each chromosome encodes an algorithm and a feature set; a domain knowledge store that maintains a plurality of algorithms and a plurality of features; a system for applying a generation of chromosomes to a set of data to provide a set of results; and a fitness function for evaluating the set of results to rate a performance of each chromosome in the set of chromosomes; wherein the evolutionary computing engine is adapted to evolve a subset of the set of chromosomes into a new generation of chromosomes.

20 Claims, 12 Drawing Sheets

CHOOSING PATTERN RECOGNITION ALGORITHMS AND DATA FEATURES USING A GENETIC ALGORITHM

FIELD OF THE INVENTION

This disclosure is related generally to perpetual problem analytics, and more particularly to a system and method of the joint selection of pattern recognition algorithms and data features.

BACKGROUND OF THE INVENTION

The accelerating data avalanche is gaining unimpeded momentum that is enabled by the commoditization of computing storage, devices, bandwidth, connectivity, processor parallelization, and processor speed. Consequently, numerous data mining algorithms are becoming available to sift through massive amounts of information. Businesses and governments that do not embrace advanced data analytics will not survive within an environment of highly connected and intelligent enterprise.

Along with the advancement of data mining tools, applying the right algorithm to a problem is critical. For example, practitioners might choose a familiar algorithm for a specific problem that produces a suboptimal solution while a highly tuned system continually determines the best algorithm to apply towards a problem. Equally important, the diversity and dimensionality of data is becoming more challenging and is already intractable. Dimensionality reduction and variable selection is required to select the most important traits of data from an exhaustive set of features. However, varying algorithms will perform differently given changing feature sets. Accurately selecting an algorithm and a set of features is critical to achieve optimal performance.

SUMMARY OF THE INVENTION

The present invention relates to a system, method and program product for identifying an algorithm and feature set to solve a problem. In a first aspect, the invention provides a perpetual analytics system for a joint selection of an algorithm and feature set to solve a problem, comprising: an evolutionary computing engine for processing data encoded as chromosomes, wherein each chromosome encodes an algorithm and a feature set; a domain knowledge store that maintains a plurality of algorithms and a plurality of features; a system for applying a generation of chromosomes to a set of data to provide a set of results; and a fitness function for evaluating the set of results to rate a performance of each chromosome in the set of chromosomes; wherein the evolutionary computing engine is adapted to evolve a subset of the set of chromosomes into a new generation of chromosomes.

In a second aspect, the invention provides a method of selecting an algorithm and feature set to solve a problem, comprising: providing an initial generation of chromosomes, wherein each chromosome encodes an algorithm and a feature set; applying each chromosome from the initial generation of chromosomes to a set of data to provide a set of results; evaluating the set of results with a fitness function to rate a performance of each chromosome in the initial set of chromosomes; and evolving a subset of chromosomes to creates a new generation of chromosomes.

In a third aspect, the invention provides a program product stored on a computer readable storage medium for selecting an algorithm and feature set to solve a problem, comprising: program code for providing an initial generation of chromosomes, wherein each chromosome encodes an algorithm and a feature set; program code for applying each chromosome from the initial generation of chromosomes to a set of data to provide a set of results; program code for evaluating the set of results with a fitness function to rate a performance of each chromosome in the initial set of chromosomes; and program code for evolving a subset of chromosomes to creates a new generation of chromosomes.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
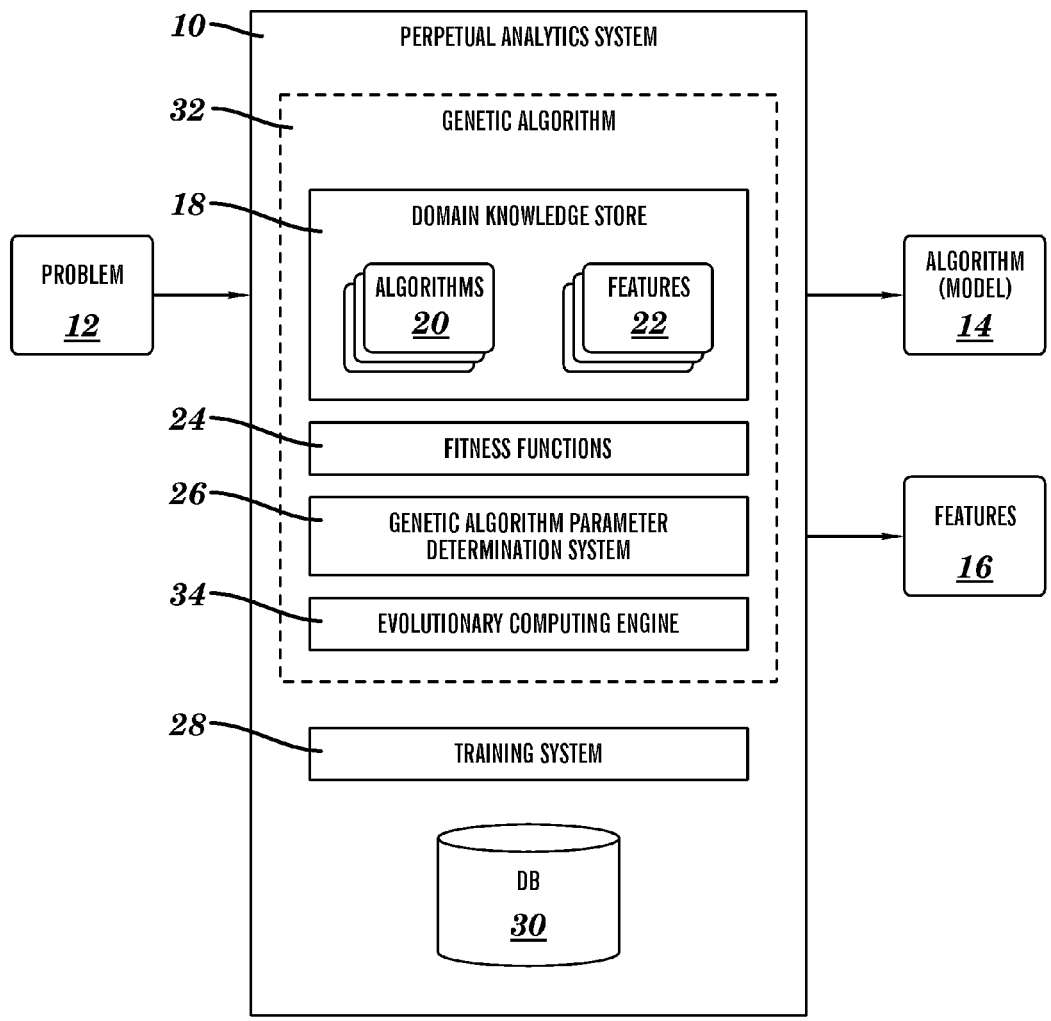
FIG. 1 depicts a perpetual analytics system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Currently, purely academic, complex and novel algorithms are distilling information into knowledge to solve difficult and real business challenges. However, with the growing number of regressors, classifiers and density estimators, determining which algorithm to implement on a particular problem domain currently requires extensive domain expertise. For example, illustrative algorithms include techniques based on Support Vector Machines (SVM), Neural Networks, Bayesian Belief Networks, numerous clustering algorithms, Hidden Markov Models, Case Based Reasoning, Reinforcement Learning, Regression, Mixture Models, Kernels, etc. The field of statistics produces similarly diverse methods such as Principal Component Analysis, Probability Density Functions, Discrete and Continuous distributions, hypothesis testing, etc. The present invention addresses the process of selecting an analytic algorithm or model and the features of the data of which to process. A framework of feature and algorithm selection is herein described for perpetual knowledge generation.

The selection of features and algorithms to apply for a specific problem must be robust such that they can be encoded into a search and optimization problem. High dimensional searching requires careful consideration to explore the least amount of space while finding a best solution or a Pareto optimal hull. Evolutionary algorithms, modeled from nature, provide a parameterized framework for such searching. Nature provides natural systems that evolve over time within the context of an ecology. Within natural selection, the fittest members or groups of species pass their respective genes to the next generation. As such, the entire species adapts and changes as ecologies change. The best fit members defined as a combination of data features and algorithms are suited for a given environment or problem.

Genetic algorithms are inspired by biology and provide robust search and optimization techniques. Genetic algorithms utilize a fitness function to measure the utility of a chromosome. Generally, a fitness function is either applied directly to a chromosome or the phenotype of the translated representation. A chromosome is a concise and natural data representation of a set of parameters. The entire set of chromosomes creates a generation. The genetic operators within the framework of the algorithm can be either binary or probabilistic. Reproduction, crossover and mutation are the three core functions that generally exist within a genetic algorithm.

FIG. 1 depicts a perpetual analytic system 10 for selecting an algorithm 14 and set of features 16 based on an inputted problem 12. (It is understood that for the purposes of this disclosure, the term "algorithm" includes any approach for solving a problem, e.g., models, neural networks, artificial intelligence, etc.) Perpetual analytic system 10 generally includes a genetic algorithm 32 that encompasses: a domain knowledge store 18 the includes of a set of algorithms 20 and a set of features 22; one or more fitness functions 24 for determining how well a selected algorithm/feature performs; a genetic algorithm (GA) parameter determination system 26 that determines how the genetic algorithm 32 is to be implemented; and an evolutionary computer engine 34 for processing chromosomes that encode algorithm/feature sets. Also included is a training system 28 for off line and on line training and a database 30 of data relevant to the particular problem 12.

Domain Knowledge

The perpetual analytic system 10 is implemented using the genetic algorithm 32. The framework itself requires domain knowledge maintained within domain knowledge store 18. The No Free Lunch Theorem states that the distribution of a pair of solutions on all problems are equal. In other words, an algorithm will perform well on one set of problems while performing poorly on the remaining set. More formally, $$\Sigma_f P(d_m^y|f,m,a_1) = \Sigma_f P(d_m^y|f,m,a_2) \quad (1)$$

where $a_1$ and $a_2$ are a pair of differing algorithms, m are distinct points with the problem space, and $d_m^z(m)$ is the associated cost or objective value of sample m.

If knowledge is not provided for an algorithm, there is no guarantee that a solution will be effective. As such, the domain knowledge store 18 abstracts specific algorithms 20 from the framework in such a way that a problem is not coupled with the genetic algorithm 32 yet maintains high domain cohesion. Domain knowledge store 18 encompasses algorithms 20 that are designed to run on a specific problem 12. For example, within speech recognition, a binary search tree may be used specifically for n-gram processing. Domain specific questions, such as "Do you like sports" accumulates evidence for a particular branch point within the tree. Further, complexity is encoded within each of the questions and can be designed such that the higher the tree ply level, the more complex the n-gram becomes. The aforementioned algorithm would be one of many algorithms 20 within the domain knowledge store 18. Equations 2 and 3 define two sets such that $$\forall a_n \in A_{max} \quad (2)$$

$$A_i \subseteq A_{max} \quad (3)$$

$a_n$ denotes a specific domain algorithm that resides within the complete set of algorithms $A_{max}$. Subsets of algorithms denoted $A_i$ are subsets of the entire collection of algorithms.

Coupled with the algorithms 20, an exhaustive list of features 22 are stored within the domain knowledge store 18. The feature list encompasses all of the features 18 maintained by a dataset, e.g., database 30. Pattern recognition algorithms ingest the entire set or subsets of the feature space. An evolved feature selector determines the subset of features that form the feature space for each algorithm.

$$\forall f_n \in F_{max} \quad (4)$$

$$F_i \subseteq F_{max} \quad (5)$$

$f_n$ denotes a specific domain feature that is a member of the complete set of features $F_{max}$. Subsets of features, denoted by $F_i$, are subsets from $F_{max}$.

Fitness Functions

Another domain knowledge factor within the perpetual analytics system 10 includes a fitness function 24. A myriad of fitness functions 24 that relate to data retrieval or pure chromosome structure produce the fitness landscape that can be applied to the output of each algorithm 20, which is the phenotype of specific chromosomes. The fitness function 24 $e_n$ measures the optimality of a chromosome.

Several fitness functions, $E_i$, can be combined together for an aggregate total of an optimality score.

$$\forall e_n \in E_{max} \quad (6)$$

$$E_i \subseteq E_{max} \quad (7)$$

Genetic Algorithm Parameters

The parameters of the genetic algorithm 32 define the granularity and scope for finding the best algorithm 14 and set of features 16 for a given problem 12. The evolutionary framework is bootstrapped by the number of chromosomes within each generation, cross over type and rate, mutation rate and the number of generations or an exit criterion. In effect, the genetic algorithm parameters describe how to search the space of which it encodes. The domain algorithms 20 and features 22 create the contours within the search space that will be evaluated by domain fitness functions 24. As is standard within genetic algorithms 32, a score of fitness is assigned to each chromosome. The a priori information with respect to reproduction ensures the fitness criterion is maximized before the generation of offspring. In this way, low scoring individuals are minimized within the population. As a result, the best or close to best algorithm and set of features will emerge.

Much design principle was maintained within the perpetual analytic system 10 so that common data mining pitfalls are minimized. Each algorithm 20 within the domain knowledge store 20 is trained and evaluated by training system 28 on separate data sets to protect against over fitting. Training and evaluation can follow the n-fold process for each independent algorithm. The plurality of algorithms (or models) within the genetic algorithm 32 construct eliminates the risk of relying on one model, but rather, models and features compete for eventual implementation. Though the experimenter must ask the right question, the feature selector determines the complexity of the question to ask. External knowledge and wisdom is encapsulated by the collection of algorithms 20 and the fitness function(s) 24. As more data is acquired, each algorithm 20 can be retrained and/or the chromosome fitness functions 24 modified. In this way, the modelers will not become stuck on a single model or sets of features. Instead, the genetic algorithm 32 will adapt to the accumulation of data and select an algorithm 14 and sets of features 16 given the data. If two or more models are recommended by the algorithm selector 34, those models can exist within an ensemble.

Figure 2:
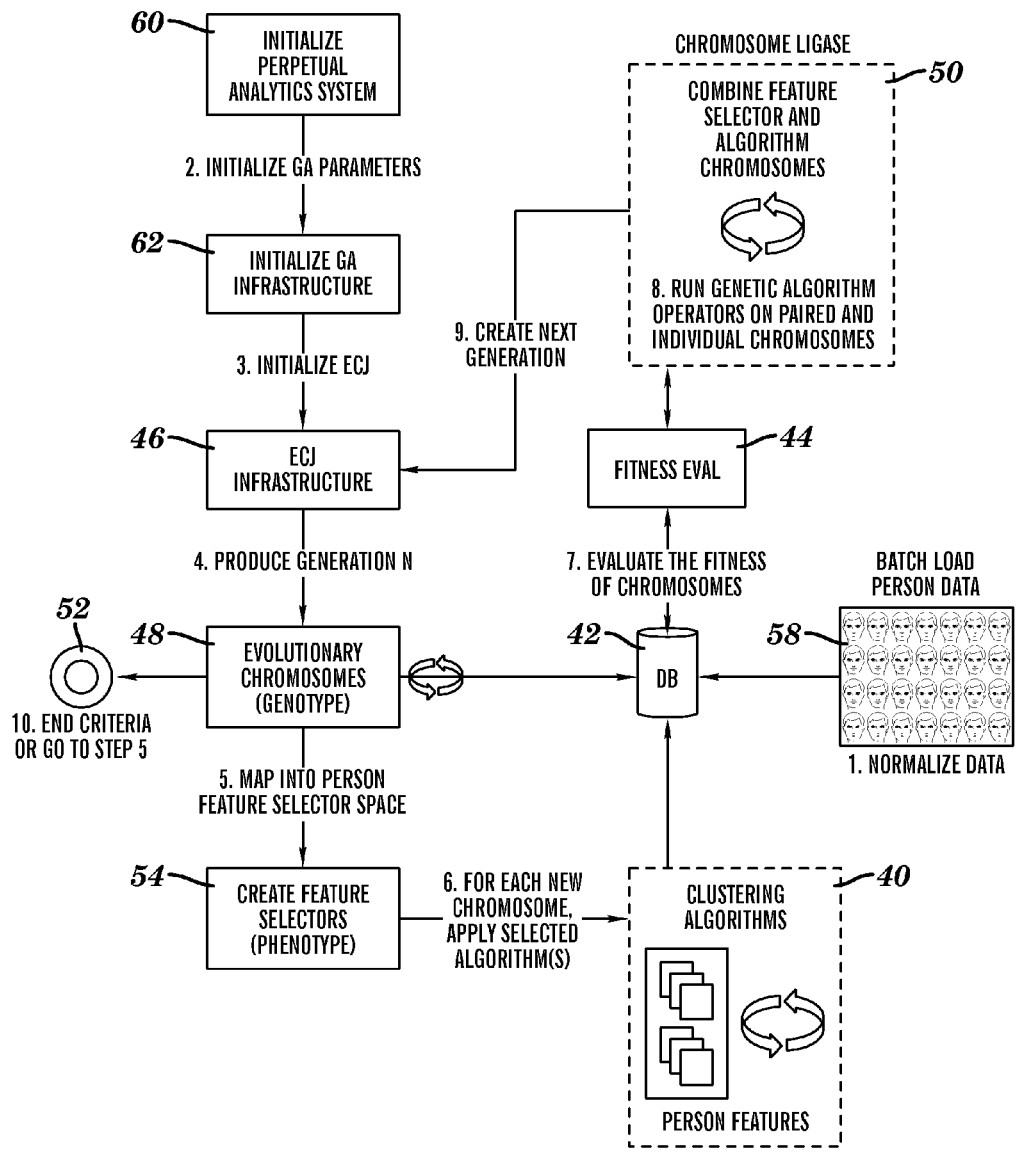
FIG. 2 depicts a perpetual analytic system applied to a people parsing problem in accordance with an embodiment of the present invention.

An implementation of a genetic algorithm within a people parsing context problem is shown within FIG. 2. In this example, the goal is, for example, to recognize a face from a database 42 of face data. Domain knowledge store 40 thus may include person features, hierarchical and decision tree algorithms and a specific fitness function produced for people parsing. The hypothesis driven experimentation is summarized within Equations 8 and 9.

$$\begin{cases} H_0: A \\ H_1: \beta \end{cases} \quad (8)$$

$$\{\alpha_1, \alpha_2, a_3\} \in A \quad (9)$$

The null hypothesis, A, states that an optimal selection of a subset of facial attributes, a hierarchical algorithm, and decision tree from the domain store will not group similar probes and gallery samples. Decomposing A, $a_1$, $a_2$ and $a_3$ assert that cluster quality, search efficiency, and name search quality will not be optimized. The alternative hypothesis, β, believes that a set of optimized data features and algorithms will be an output from the perpetual analytic system 10 (FIG. 1). If the alternative hypothesis, β, is true, the null hypothesis will be invalid.

Within FIG. 2, the domain knowledge store 40 contains trained and tuned algorithms on person samples. An exhaustive list of potential person features such as gender and hair color is maintained within the system as sets of chromosomes where each chromosome encodes a combinatorial selector of features. A fitness function 44 is developed and implemented to measure the utility of a solution against a desired criterion. Before execution of the genetic algorithm, people data from a gallery 58 (e.g., PubFig) is normalized and ingested into an enterprise database or data warehouse 42. Given the data, person features, hierarchical algorithm, decision tree, and the fitness functions, the process of selecting an algorithm and set of features begins at 60 and 62 where the perpetual analytics system 10 and GA infrastructure are initialized.

Figure 3:
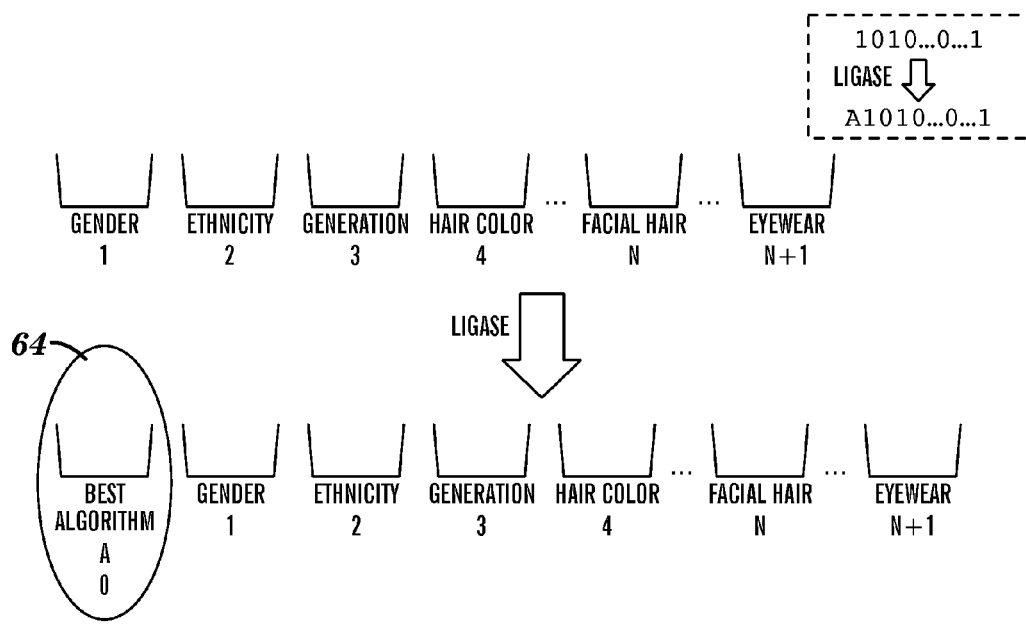
FIG. 3 depicts a chromosome in accordance with an embodiment of the invention.

Genetic algorithm parameters form a GA infrastructure and include elements such as generation number, population size, crossover type, mutation rate and chromosome encoding that is passed into a genetic computing infrastructure, such as the Evolutionary Computing in Java (ECJ Infrastructure 46). The evolutionary chromosomes 48 from ECJ infrastructure 46 represent binary feature selectors. A position within the chromosome, e.g., such as that shown in FIG. 3, encodes the algorithm selector 64. The feature selector and algorithm selector chromosomes are ligased together to form an individual within a population. An entire population of species is produced that is the basis for the rest of the genetic algorithm.

Referring again to FIG. 2, each chromosome is translated into a phenotype 54 by applying the algorithm/feature set within the domain knowledge store 40 encoded on the chromosome to data stored in database 42. The chosen algorithm builds a person gallery model for each respective chromosome. After the entire genotype has been translated into a phenotype, the phenotypes are evaluated with the domain fitness function 44. The survivability of each chromosome is determined by the score. i.e., the best chromosomes are evolved with genetic operators to form a next generation. For example, in a top ranked pair wise order, chromosomes are crossed over, e.g., by a chromosome ligase process 50. The resulting members are randomly mutated to increase search space exploration without degrading into a random walk. Finally, an exit criterion 52 is measured to determine the convergence of a best or best set of features and algorithms for a specific algorithm.

Perpetual Analytics

Figure 4:
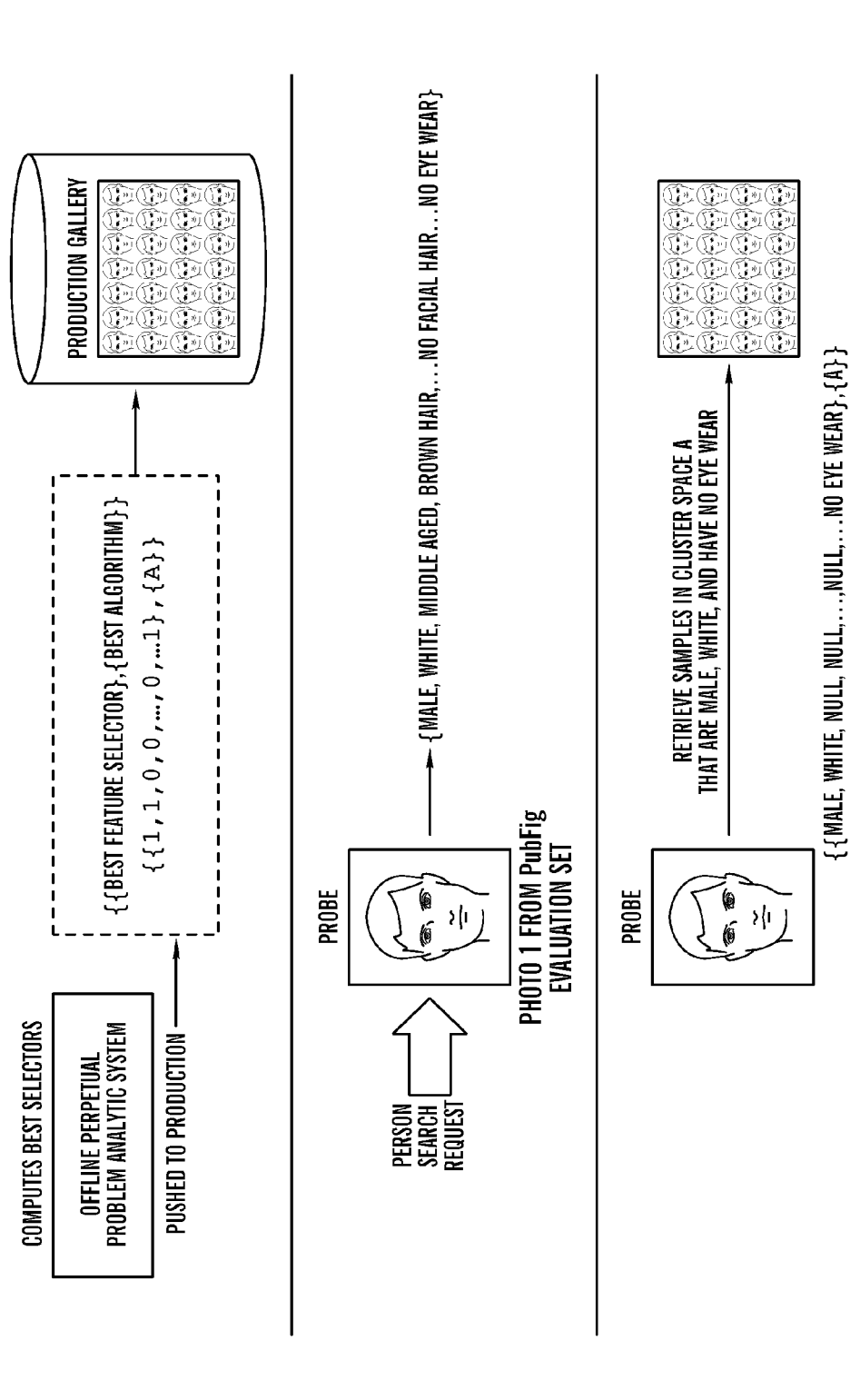
FIG. 4 depicts a gallery model update in accordance with an embodiment of the invention.

As more data is ingested into the gallery, the gradients of the search space changes. By extension, the algorithm and feature selector will need to search the contours of the new search space. An offline genetic algorithm framework is designed to run on a static gallery space. The resulting gallery model and feature selections are pushed to a production environment that is continually accumulating new data outside of the explored gallery. To maintain a high fidelity gallery model, the next running of the genetic algorithm framework will include both the previous gallery and the newly introduced members. In addition to data change, new algorithms can be introduced into the offline system. The framework is extensible with independent variables, algorithms and features. FIG. 4 depicts the process flow of gallery model updating.

Figure 5:
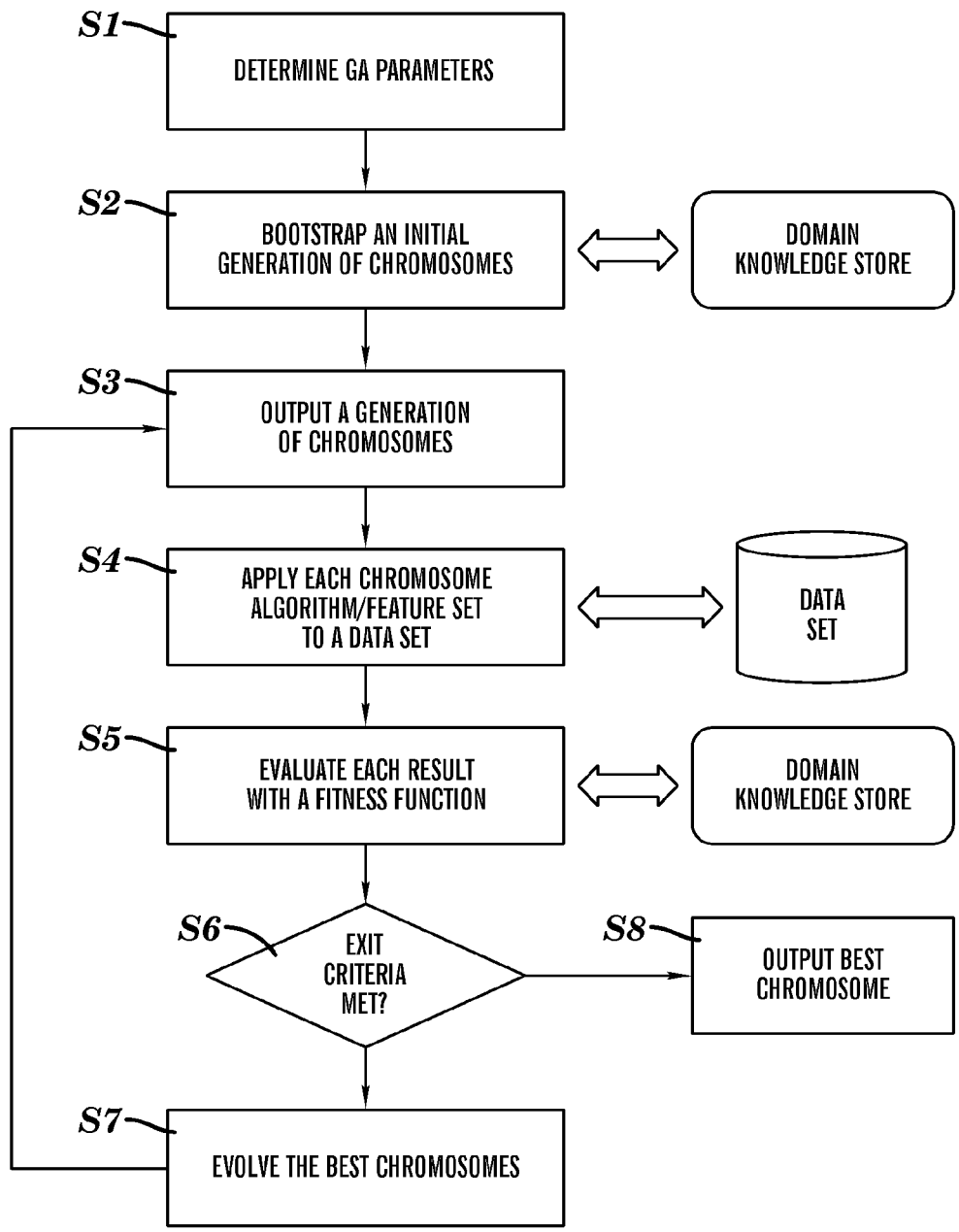
FIG. 5 depicts a flow diagram of a genetic algorithm in accordance with an embodiment of the invention.

FIG. 5 depicts a generalize flow diagram of a genetic algorithm. At S1, GA parameters are determined, and at S2, an initial generation of chromosomes is determined, e.g., based on the domain knowledge store. At S3, a generation of chromosomes (i.e., genotypes) is outputted. At S4, each chromosome (i.e., the encoded algorithm and feature set) is applied to a data set, i.e., creating a phenotype. At S5, each resulting phenotype is evaluated with a fitness function to determine how well each particular algorithm/feature set performed. At S6 a decision is made whether an exit criteria is met. If yes, one or more of the best chromosomes are output at S8 to reflect the best algorithm and feature set to use to solve the problem. If not, a set of the best chromosomes are evolved at S7 to create a new generation, which are then output again at S3 to repeat the process.

Genetic Algorithm Theoretical Foundation

The design of a genetic algorithm depends heavily on the underlying selection scheme, its parameter values and the value of evolutionary parameters, like mutation and crossover rates. In this section a case is made for using tournament selection, Holland's Schema Theorem is then introduced as a general theoretical tool for determining the values of evolutionary parameters, and then Schema Theorem to tournament selection is adapted. This will allow us to find an estimate of the mutation and crossover rates for our case, dependent on the proportion of the population finally occupied by the highest fitness found schema. Finally we will derive a way to obtain the optimal population size given that a certain minimum level of mutational change has to be retained between generations.

Tournament Selection

There are various selection schemes one can choose from when designing a genetic algorithm. The most popular selection schemes are fitness proportionate (also called roulette-wheel), stochastic universal sampling, ranking, local selection, truncation selection, and tournament selection. Stochastic universal sampling and tournament selection are the selection schemes mostly used in practice, since they are easy to implement, and are associated with low stochastic noise. Tournament selection has the advantage over stochastic universal sampling in that it can be easily adapted to parallel computing architectures.

Genetic Algorithm Parameter Determination

Holland's Schema Theorem is applicable to a population, so it can be used to derive estimates for crossover and mutation rates. The first step is, however, to transform the Schema Theorem into a version that is applicable to tournament selection, since Holland's original version was aimed towards fitness proportionate selection Schema Theorem: The expected number of schema $\xi$ at generation t+1 after one point crossover and mutation is $$E[\xi, t+1] \geq \left[1 - p_c \cdot \frac{l(\xi)}{l-1} \cdot (1 - P[\xi, t])\right] \cdot (p_M^0)^{h(\xi)} \cdot \frac{\hat{\mu}_\xi}{\hat{\mu}(t)} \cdot E[\xi, t] \qquad (10)$$

where $P[\xi,t]$ is the probability of crossing with the same schema $\xi$, $p_c$ is the crossover probability, $p_M^0$ is the positional probability of no mutation occurring, $h(\xi)$ is the schema order, $\hat{\mu}(t)$ is defined in equation (10), $l(\xi)$ is the unconstrained distance of the schema, l is the length of the genome, $E[\xi,t]$ is the number of schema $\xi$ at time t, and $\hat{\mu}_\xi$ is the absolute fitness of schema $\xi$ (Note that the absolute fitness of a schema is not dependent on time!) and $$\hat{\mu}(t) = \frac{1}{n_t} \sum_{t=1}^{n_t} E[\xi, t],$$

where $n_t$ is the number of schemata in the population at time t.

Holland derived his Schema Theorem for the case of fitness proportionate selection, and so we have to modify it such that it fits our tournament selection scenario. The expression $$\frac{\hat{\mu}_\xi}{\hat{\mu}(t)} \cdot E[\xi, t]$$

used in the Schema Theorem betrays its fitness proportionate bias and we need to rewrite this term using tournament selection scheme parameters.

$$\frac{\hat{\mu}_\xi}{\hat{\mu}(t)} \cdot E[\xi, t]$$

is the expected number of copies of schema $\xi$ in the t+1-th generation before cross over and mutation events occur.

Let an initial population of size N be given and let the tournament size be k. The tournament selection process we are using consists of the following steps:

1. Draw without replacement k schemata from the population of size N.
2. Put those k schemata back into the population.
3. Draw without replacement another set of k schemata from the population of size N.
4. Choose the individual of highest fitness from the first set and pair it with the individual of highest fitness of the second set.
5. Perform crossover on the paired schemata with probability $p_c$.
6. Perform mutation on the from step 5 resulting two schemata.
7. Repeat steps 1-6 N/2 times and end up with the population of the next generation.

In this section we are only interested in steps 1-4 since we just want to rewrite the expression for the expected number of copies of a schema before mutational operators are applied. So since we are not doing anything with the pairs of individuals we are obtaining we can simplify the process by looking at generating the daughter generation as drawing with replacement sets of k schemata N times from the parent population. The first question is then: What is the probability of obtaining in the daughter population the best schema exactly i times, with i=0, 1, ..., N? First we are looking at the special case that we have a single copy of the best fitness schema. There are $$\binom{N}{i}$$

possibilities to arrange the i best schema copies along N positions and for each of these cases there are $$\binom{N-1}{k-1}^i \cdot \binom{N}{k-1}^{N-i}$$

possibilities to arrive at the given pattern. Since there are overall $$\binom{N}{k}^N$$

possibilities to draw sets of k schemata out of N the probability of drawing the best schema exactly i times calculates to $$\binom{N}{i} \cdot \frac{\binom{N-1}{k-1}^i \cdot \binom{N-1}{k}^{N-i}}{\binom{N}{k}^N},$$

which after simplification results in $$\binom{N}{i} \cdot \left(\frac{k}{N}\right)^i \cdot \left(\frac{N-k}{N}\right)^{N-i}.$$

This means that the number of copies of the best schema in the daughter population is binomially distributed $$B\left(N, \frac{k}{N}\right).$$

So the expected number of best schema copies in the daughter population is k, and the standard deviation is $$\sqrt{\frac{k \cdot (N-k)}{N}}.$$

Note that $$\lim_{N \to \infty} \sqrt{\frac{k \cdot (N-k)}{N}} = \sqrt{k} = \sqrt{E\left(B\left(N, \frac{k}{N}\right)\right)}.$$

Our result so far says, that if we have just one copy of the best schema in the population, then under tournament selection we expect in the next generation k copies. We now want to generalize this result to having at least one copy of the best schema, so let the number of copies of the best schema in the parent population be s with s∈IN, where IN is the set of the positive integers. Then the probability of not obtaining a best schema during a single draw of a tournament set is $$\frac{\binom{N-s}{k}}{\binom{N}{k}},$$

and since we take exactly one schema from each tournament set the probability of obtaining exactly one best schema from a tournament set is $$1 - \frac{\binom{N-s}{k}}{\binom{N}{k}}.$$

So we obtain in the daughter population exactly i best schemata with the probability $$\binom{N}{i} \cdot \left(1 - \frac{\binom{N-s}{k}}{\binom{N}{k}}\right)^i \cdot \left(\frac{\binom{N-s}{k}}{\binom{N}{k}}\right)^{N-i},$$

which again is a binomial probability. The expected value of the number of best schemata in the daughter generation if there are s best schemata in the parent population is $$N \cdot \frac{\binom{N-s}{k}}{\binom{N}{k}}.$$

This expression is not easily simplified into a more approachable form, but when we take the limit over the population size then we obtain:

$$\lim_{N \to \infty} N \cdot \left(1 - \frac{\binom{N-s}{k}}{\binom{N}{k}}\right) = k \cdot s.$$

We can see this by the following calculation:

$$\lim_{N \to \infty} N \cdot \left(1 - \frac{\binom{N-s}{k}}{\binom{N}{k}}\right) = \lim_{N \to \infty} N \cdot \left(1 - \prod_{i=0}^{k-1} \frac{(N-s-i)}{(N-i)}\right)$$

$$= \lim_{N \to \infty} N \cdot \left(1 - \prod_{i=0}^{k-1} \left(1 - \frac{s}{N-i}\right)\right)$$

$$= \lim_{N \to \infty} N \cdot \left(1 - \left(1 - \left(\sum_{i=0}^{k-1} \frac{s}{N-i}\right) + o\left(\frac{1}{N}\right)\right)\right)$$

$$= \lim_{N \to \infty} N \cdot \left(\sum_{i=0}^{k-1} \frac{s}{N-i}\right)$$

$$= \lim_{N \to \infty} \sum_{i=0}^{k-1} \left(s \cdot \frac{N}{N-i}\right)$$

$$= \sum_{i=0}^{k-1} s$$

$$= k \cdot s$$

Since $$\prod_{i=0}^{k-1} \frac{(N-s-i)}{(N-i)} < \prod_{i=0}^{k-1} \frac{(N+1-s-i)}{(N+1-i)}$$

for all N∈IN, we see that the expected value is increasing in N. As before we are also interested in the standard deviation which is $$\sqrt{N \cdot \left(1 - \frac{\binom{N-s}{k}}{\binom{N}{k}}\right) \cdot \left(\frac{\binom{N-s}{k}}{\binom{N}{k}}\right)}.$$

And we obtain $$\lim_{N \to \infty} N \cdot \left(1 - \frac{\binom{N-s}{k}}{\binom{N}{k}}\right) \cdot \left(\frac{\binom{N-s}{k}}{\binom{N}{k}}\right) = k \cdot s$$

as before in the simpler case of k=1. We see this by going through the following calculation:

$$\lim_{N\to\infty} N \cdot \left(1 - \frac{\binom{N-s}{k}}{\binom{N}{k}}\right) \cdot \left(\frac{\binom{N-s}{k}}{\binom{N}{k}}\right) = \lim_{N\to\infty} N \cdot \left(1 - \prod_{i=0}^{k-1} \frac{(N-s-i)}{(N-i)}\right) \cdot$$

$$\prod_{i=0}^{k-1} \frac{(N-s-i)}{(N-i)}$$

$$= \lim_{N\to\infty} N \cdot \left(1 - \prod_{i=0}^{k-1} \left(1 - \frac{s}{N-i}\right)\right) \cdot$$

$$\prod_{i=0}^{k-1} \left(1 - \frac{s}{N-i}\right)$$

$$= \lim_{N\to\infty} N \cdot \left(1 - \left(1 - \left(\sum_{i=0}^{k-1} \frac{s}{N-i}\right) + o\left(\frac{1}{N}\right)\right)\right) \cdot$$

$$\left(1 - \left(\sum_{i=0}^{k-1} \frac{s}{N-i}\right) + o\left(\frac{1}{N}\right)\right)$$

$$= \lim_{N\to\infty} N \cdot \left(\sum_{i=0}^{k-1} \frac{s}{N-i}\right) \cdot$$

$$\left(1 - \left(\sum_{i=0}^{k-1} \frac{s}{N-i}\right)\right)$$

$$= \lim_{N\to\infty} \sum_{i=0}^{k-1} \left(s \cdot \frac{N}{N-i}\right) + o\left(\frac{1}{N}\right)$$

$$= \sum_{i=0}^{k-1} s$$

$$= k \cdot s$$

The generalization shows us that the number of best copies grows linearly with the generation count with intensity k, and we obtain that we have to replace $$\frac{\hat{\mu}_\xi}{\hat{\mu}(t)} \cdot E[\xi, t]$$

by the expression $k \cdot E[\xi,t]$, and as final result we obtain for the schema theorem under tournament selection the following inequality:

$$E[\xi, t+1] \geq \left[1 - p_c \cdot \frac{l(\xi)}{l-1} \cdot (1 - P[\xi, t])\right] \cdot (p_M^0)^{h(\xi)} \cdot k \cdot E[\xi, t]$$

A major problem in running evolutionary algorithms is to estimate the mutation rates properly. If the mutation rate is too low, then the process gets easily trapped in sub-optimal situations, while if too high, optimal situations might not be realized due to rapid fluctuations. The goal of this section is to provide reasonable estimates for the rate of mutation, and, linked with that, the rate of crossover. The following paragraph will discuss the effect of mutation and crossover on the schema of highest fitness and this will provide us with an approach to the estimation problems In a population without crossover and mutation the deterministic part of the evolutionary process, namely reproduction and selection will result eventually in the population consisting entirely of the schema with the highest fitness. Adding crossover to this deterministic system will not change the eventual outcome if the crossover does not destroy every occurrence of the highest fitness schema during the initial time period where that schema frequency is low. Crossover will delay the final outcome, but will not change it.

The outcome changes, however, when adding mutation. In the following we will assume that each defined position of the schema experiences mutation with the same probability and that mutation occurs independently across those positions. Let the number of the defined positions of schema $\xi$ be denoted by $h(\xi)$, and denote with $p_M^0$ the probability that at any given defined position and time point no mutation occurs. Now lets assume for the moment that the whole population consists initially exclusively of copies of the highest fitness schema, then within one generation mutation will retain just a proportion of that population, and ignoring crossover that proportion will be $(p_M^0)^{h(\xi)}$. As the process continues, selection will keep eliminating all other schemata but $\xi$, while mutation will convert copies of $\xi$ into other schemata. We expect, therefore, that in a population with mutation (and no crossover) the schema of highest fitness eventually will be occupying a proportion of about $(p_M^0)^{h(\xi)}$ of the population. Adding crossover means that schemata added by mutation possibly interact with $\xi$, but if they do the results will be selected against like as if they had been generated by mutation. So crossover has an effect like boosting the mutations rate, which means lowering the final proportion of schema $\xi$.

We return now to the issue mentioned in the introduction to this section, namely the proper estimate of the mutation rate, with an underestimation of that rate leading to entrapment, while an overestimation results in loss of information, means lack of convergence.

One approach to avoid the latter case is to define a target proportion for the schema of highest fitness, which then allows us, according to the discussion above, to derive criteria for the mutation and crossover rate. This approach also will provide a lower bound for the mutation rate, and so avoid the first case of getting trapped in too sub-optimal solutions, since defining a target proportion less than 1 forces the mutation rate above a minimum value. Assuming a target proportion has also implicitly the effect that the process is forced to converge, and that indefinite fluctuation is avoided.

In the following we will take the approach of defining a target proportion $p_\xi$ for the highest fitness schema $\xi$, and we will use the Schema Theorem to obtain estimates for the crossover rate $p_c$ and the positional non-mutation rate $p_M^0$. We denote as $p_M^1$ the probability that a mutation occurs, so $p_M^1 := 1 - p_M^0$, so $p_M^1$ is the rate of mutation of the mutational process.

We require $p_M^0$ and $p_c$ to be chosen such that once the value of $P[\xi,t]$ is sufficiently close to $p_\xi$, lets say $|P[\xi,t]-p_\xi|<\epsilon$, convergence to the limit population dominates the process, which means that $$\left[1 - p_c \cdot \frac{l(\xi)}{l-1} \cdot (1 - P[\xi,t])\right] \cdot (p_M^0)^{h(\xi)} \cdot k > 1$$

for almost all $t \geq T_0$, where $T_0$ is the first generation for which $|P[\xi,t]-p_\xi|<\epsilon$. Taking the limit we obtain:

$$\lim_{t \to \infty} \left[1 - p_c \cdot \frac{l(\xi)}{l-1} \cdot (1 - P[\xi,t])\right] \cdot (p_M^0)^{h(\xi)} \cdot k \geq 1,$$

which means that $$\lim_{t \to \infty} \left[1 - p_c \cdot \frac{l(\xi)}{l-1} \cdot (1 - P[\xi,t])\right] \cdot (p_M^0)^{h(\xi)} \geq \frac{1}{k}.$$

Therefore $$\left[1 - p_c \cdot \frac{l(\xi)}{l-1} \cdot (1 - p_\xi)\right] \cdot (p_M^0)^{h(\xi)} \geq \frac{1}{k}.$$

Solving for $(p_M^0)^{h(\xi)}$ we obtain $$(p_M^0)^{h(\xi)} \geq \frac{1}{k \cdot \left[1 - p_c \cdot \frac{l(\xi)}{l-1} \cdot (1 - p_\xi)\right]},$$

and finally $$(p_M^0)^{h(\xi)} > \frac{1}{k} \cdot \left[1 + p_c \cdot \frac{l(\xi)}{l-1} \cdot (1 - p_\xi)\right].$$

[The last inequality was obtained from the fact that $$\frac{1}{1-c^2} > 1$$

for any $c \in (0,1]$, and therefore $$\frac{1}{1-c} > 1 + c.$$

Indeed the underlying equality is $$\frac{1}{1-c} = 1 + c + c^2 + c^3 + \ldots .]$$

Solving now for $p_c$ we obtain $$\frac{k \cdot (p_M^0)^{h(\xi)}}{\frac{l(\xi)}{l-1} \cdot (1 - p_\xi)} - \frac{1}{\frac{l(\xi)}{l-1} \cdot (1 - p_\xi)} > p_c,$$

and finally $$\frac{(l-1)}{l(\xi) \cdot (1 - p_\xi)} \cdot k \cdot (p_M^0)^{h(\xi)} - \frac{(l-1)}{l(\xi) \cdot (1 - p_\xi)} > p_c.$$

This concludes the derivation of the relationship between the evolutionary dynamics parameters for the purpose of their estimation.

Given the parameters of the genetic algorithm with tournament selection, k=7, $p_\xi$=0.85, $\delta(H)$=34, and l=34, the terms N, $p_M^0$ and $p_c$ can be calculated. From equation X, $$\frac{7 \cdot (l-1)}{l(\xi) \cdot .15} \cdot (p_M^0)^{h(\xi)} - \frac{(l-1)}{l(\xi) \cdot .15} \geq p_c \Leftrightarrow$$

$$\frac{(l-1)}{0.02143 \cdot l(\xi)} \cdot (p_M^0)^{h(\xi)} - \frac{(l-1)}{l(\xi) \cdot .15} \geq p_c.$$

With l=34 and with schemata defined from equation X, h($\xi$)=34, which implies that l($\xi$)=33, to yield $$\frac{33 \cdot (p_M^0)^{34}}{0.02143 \cdot 33} - \frac{33}{33 \cdot .15} \geq p_c.$$

The equation simplifies to $46.6667 \cdot (p_M^0)^{34} - 6.6667 \geq p_c$. We estimate $p_M^0$ first. Since $p_c > 0$ we obtain that $46.6667 \cdot (p_M^0)^{34} > 6.6667$, and, therefore, $$p_M^0 > \left(\frac{6.6667}{46.6667}\right)^{1/34},$$

or $p_M^0 > 0.94437$. With the greater bound on $p_c$ where $p_c \le 1$ the equations can simplify to $46.6667 \cdot (p_M^0)^{34} \le 7.6667$ yielding $$p_M^0 < \left(\frac{7.6667}{46.6667}\right)^{1/34}$$

giving $p_M^0 < 0.94826$. Overall the probability of no mutation is $p_M^0 \in (0.94437, 0.94826)$. The midpoint of the interval gives $p_M^0 = 0.94632$. Using the midpoint of $p_M^0$, $p_c \le 46.6667 \cdot (\mathbf{0.94632})^{34} - 6.6667$ where $p_c \le 0.4831$.

To ensure that the schema $\xi$ of highest fitness maximally occupies 85% of the limit population we have to set the mutation rate to $p_M^1 = 0.05368$ and the crossover rate to $p_c \le 0.4831$. The larger the rate of crossover the longer it will take the population to consist of $\xi$ around 85%, and for lower $p_c$ the limit proportion is higher. However, the higher the mutation and crossover rate, the more $\xi$ schemata of highest fitness are discovered during the evolutionary process. The schema $\xi$ is dependent on the initial population distribution and changes as higher fit schemata are discovered.

Choosing the appropriate population size when running a GA is necessary for two reasons. First, if the population size is chosen too large, then the GA might not terminate in reasonable time due to immense processing effort. Second, if the population size is being chosen too small, then mutation can not at a sufficient rate introduce new schemata into the population and the algorithm will converge possibly not even to a local maximum, but rather gets stuck way before having reached a peak.

The question we are trying to answer in this section is: What is the best population size to choose when running a genetic algorithm? From that what has been mentioned before it is clear that the best population size is the smallest one that satisfies a certain requirement regarding maintaining mutational change. We tried to answer questions of the following type: Given a certain mutation rate, how large does a population have to be such that mutation will generate at least Y changed schemata with at least probability X (level of confidence X·100%) in the next generation?

Let the mutation rate per schema location be denoted by $p_M$, then the probability that a schema $\xi$ is transformed by mutation into another schema is $p_M^{eff} := 1 - (1 p_M)^{l_\xi}$, with $p_M^{eff}$ being called the effective mutation rate.

Let a population of size N be given and let $n \in \{0, 1, 2, \ldots, N\}$. Then the probability of exactly n schemata changing due to mutation from the mother to the daughter generation is:

$$P[Y = n] = \binom{N}{n} \cdot (p_M^{eff})^n \cdot (1 - p_M^{eff})^{N-n},$$

where Y is the random variable for the number of changed schemata.

From here we obtain that the probability of at least n schemata changing is $$P[Y \ge n] = \sum_{i=n}^{N} \binom{N}{i} \cdot (p_M^{eff})^i \cdot (1 - p_M^{eff})^{N-i}.$$

So we can rewrite our initial question as follows:

Given a certain schema location mutation rate $p_M$, and schema length l. How large does the size N of a population have to be such that mutation will generate at least n changed schemata with probability $$\sum_{i=n}^{N} \binom{N}{i} \cdot (1 - (1 - p_M)^l)^i \cdot (1 - p_M)^{l(N-i)} \ge X ?$$

So the parameters we have to supply are mutation rate $p_M$, schema length l, minimum number of schemata n which are supposed to change, and the level of confidence X.

Figure 6:
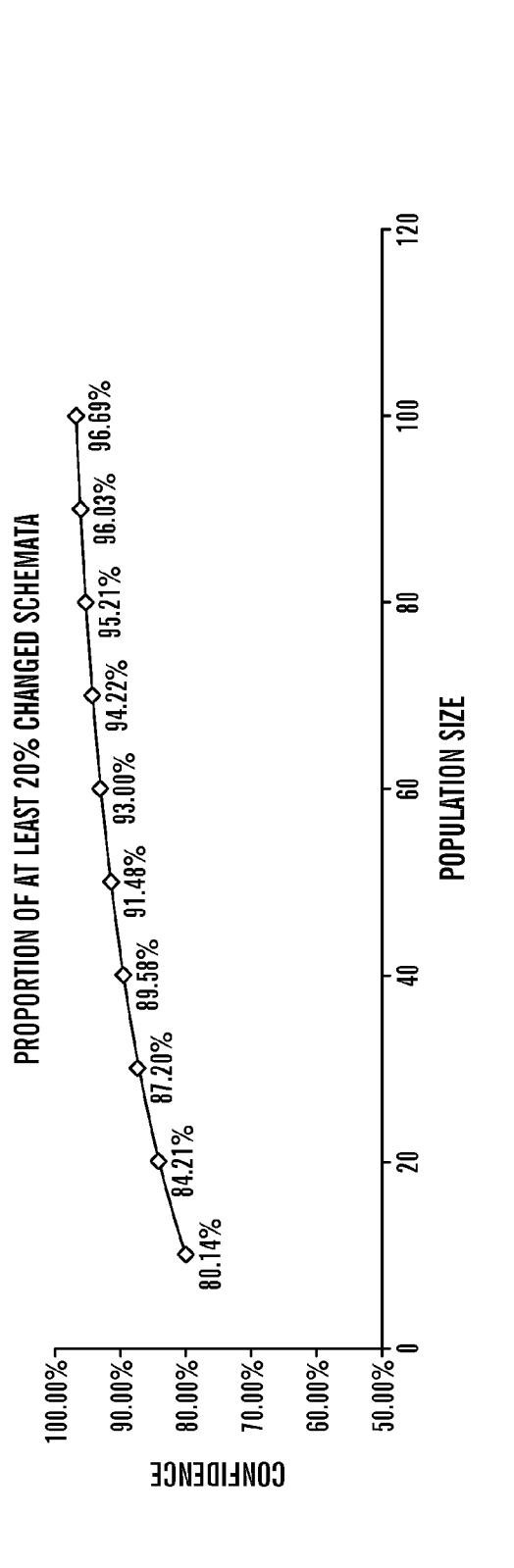
FIG. 6 depicts a table and graph describing the effects of a 20% mutation in accordance with an embodiment of the invention.

The table and graph depicted in FIG. 6 show examples which each require that 20% of the population experiences change due to mutation during the generation of the daughter population with a 95% confidence. We set the location mutation rate to 0.01, and the schema length to 32, which resulted in an effective mutation rate of about 0.275.

From the table and the accompanying graph we can see that as population size increases the probability that a certain proportion of the population changes due to mutation increases as well. This makes intuitive sense since in an infinitely large population we expect that the proportion to be changed is exactly the effective population size, namely here 27.5%, and that as the population size increases this proportion is expected to be met better and better.

Since we asked for a 95% confidence that at least 20% of the population changes, we obtain as the best population size N=80 (N=75 [the last number before 80 for which 20% is an integer] yields just a confidence of 94.7%.) The reasoning behind taking the smallest population size which just satisfies the requirements is, that any larger population size will require more processing effort.

Figure 7:
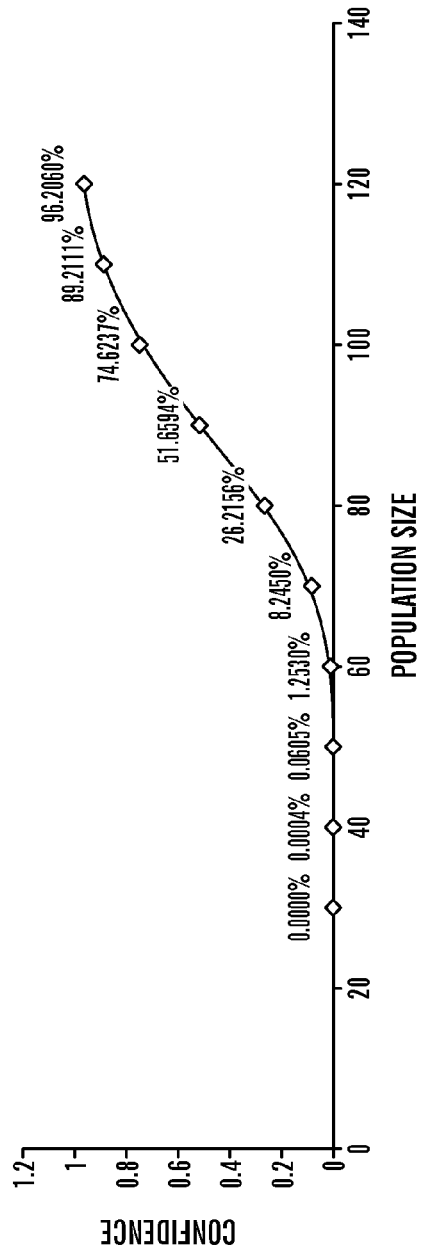
FIG. 7 depicts a table and graph describing the effects of a 25% mutation in accordance with an embodiment of the invention.

The process goes analogously if one wants to have a certain minimum amount (instead of percentage) of changes to occur. The table and graph in FIG. 7 shows how the confidence changes with increasing population size when aiming for 25 schemata to change per generation.

The best population size in this case is actually N=118 with a confidence level of about 95.3%.

A final remark shall clarify the difference between mutational change and variability. Mutational change addresses the probability that a schema will mutate into another schema during the process of generating the daughter population. A high probability of mutational change does not always mean high increase in variability. If the probability of mutating into an already present schema is large, and the parent generation shows large variability, then the increase in variability, even with a large probability of change, might be small. This is for example the case when the population size is close to the total number of possible schemata, and nearly all schemata are already present in a parent generation. In our case the number of schemata in the population will be low compared to the number of possible schemata, so the probability is high that mutation actually generates new schemata, and change indeed introduces more variability.

Genetic algorithm population estimation is derived from the above equations, which asserts that the population size is directly related with the mutation rate, schema length, minimum number of schemata that should change, and a level of confidence for parameter estimation.

Figure 8:
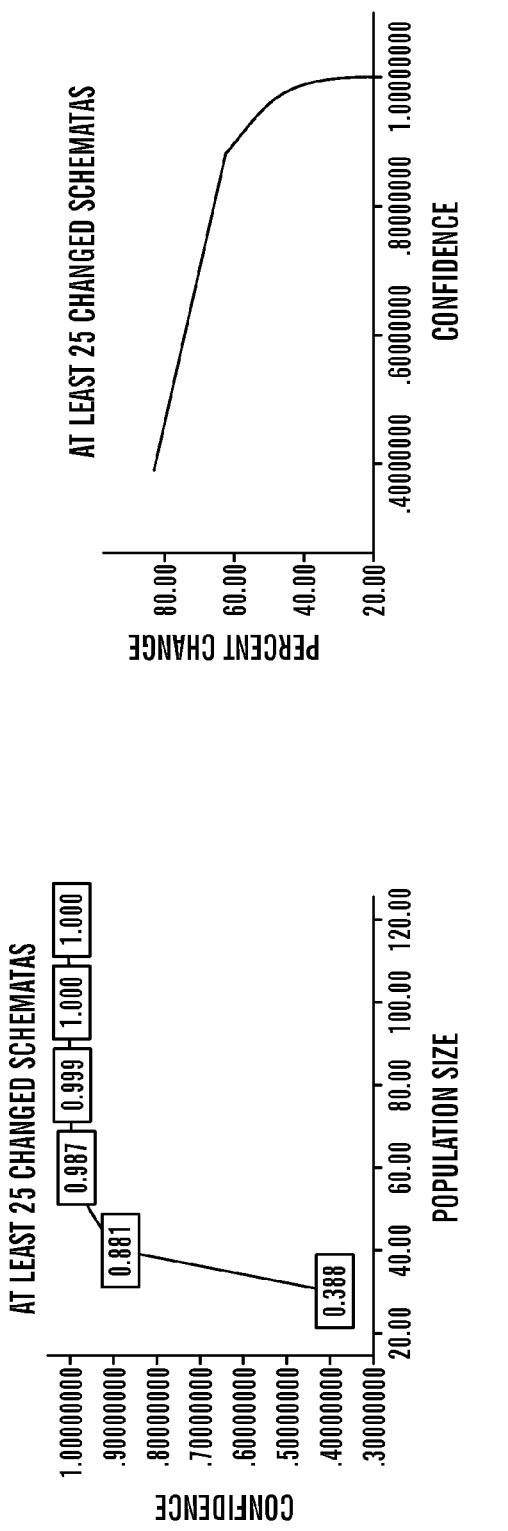
FIG. 8 depicts tables and graphs showing a simulation from a 25% mutation in accordance with an embodiment of the invention.

Given the probability of mutation, $p_M^0 = 0.94632$, simulation results with the selected number of changed schemata as 25 are shown within the tables shown in FIG. 8.

From the table shown in FIG. 8 and the accompanying graphs, as the population size increases the probability that a certain proportion of the population changes increases. The positive correlation is intuitive because with an infinitely large population we expect that the proportion to be changed to be exactly the population size or 25. Because a confidence level of at least 95% is desired, the smallest satisfying population is N=60. The smallest size population that meets the selected confidence value minimizes the evolutionary processing effort. As a comparison, several other population estimation techniques are shown in the following equations.

Following the building blocks model and bounding $N=\chi^k$ (k log $\chi$+log m), the lower bound population number follows, $$2^1(1*\log(2)+\log(33))=8.4=N. \quad (11)$$

Models that predict the size of populations for Bayesian Optimization Algorithms (BOA) bound the total number of schemata to initialize within the genetic algorithm was within a large range of [40.55, 2313.8] chromosomes.

$$O(m^{1.05}) \leq n \leq O(m^{2.1})$$

$$O(34^{1.05}) \leq n \leq O(34^{2.1}) \Leftrightarrow 40.55 \leq n \leq 2313.8$$

Goldberg asserted that $O(m^{1.4}) \approx N$ which estimated a population number for general genetic algorithms, which is within the building block and bounding model.

$$O(34^{1.4})=139.3=N \quad (12)$$

Clearly, N=60 is greater than 8.4, within the interval [40.55, 2313.8].

As a compromise between growth rate and run time, the Data Mining Feature and Algorithm Selector system utilizes the Tournament selection approach. In addition, the selection pressure of a tournament scheme is equal to the tournament. If the selection pressure is increased for the tournament scheme, the growth ratios and the upper bounds of the mutation and crossover probabilities increase. Another important aspect of the tournament scheme is the ability to parallelize processes.

TABLE 1

Tournament Selection pseudo code.

Tournament Selection

Tourney 0: Draw without replacement k schemata from the population of size N into set $S_1$
Tourney 1: Put the k schemata back into the population
Tourney 2: Draw without replacement k schemata from the population of size N into set $S_2$
Tourney 3: Pair the two highest fit schemata from $S_1$ and $S_2$
Tourney 4: Perform crossover on the paired schemata with probability $p_c$
Tourney 5: Perform mutation on the paired schemata with probability $p_m$
Tourney 6: Repeat Tourney 0-5 steps $\frac{N}{2}$ times in order to create the next generation Finally, the initial parameters of the genetic algorithm include N=60, $p_M^1$=0.05368, $p_c \leq$0.4831, k=7, $p_\subseteq$=0.85, $\delta$(H)=34, and l=34.

Fitness Function

A measure of natural selection determines which individuals survive to the next generation. Such a utility function provides a numerical metric value that can be contrasted to other members of a population. Three weighted metrics provides a fitness value for the encoding of data features and an algorithm. A cluster quality score is determined from a chromosome's structural phenotype or cluster space. The second metric calculates the efficiency of a phenotype for a specific problem. Finally, a name quality score includes precision and recall values for a specific set of features.

Intuitively, a good cluster space contains similar items within clusters that have low variance where each cluster is spread apart. The cluster space is produced from the translation of a chromosome into a phenotype as described herein. The cluster quality metric measures the space ratio of a phenotype or cluster space. The best quality measure maximizes the distance between clusters while minimizing the distance of members within a cluster. Clusters are not necessarily spherical, so the distance between clusters is in general dependent on the orientation of the clusters relative to each other. As such, the measure takes the orientation of the clusters towards each other into account. The measure between clusters can be calculated by sample to mean or sample to sample. Even though the sample based measure is computationally intensive, the clustering measure is accurate without the risk of outlier skew. Outliers have already been eliminated by the clustering algorithm. As described below, the ratio of $D_b$ or within cluster spread to $D_w$ or between cluster spread is fundamental for the quality measure.

$$D_b = \min\{d(x_i^{c_k}, x_j^{c_m})$$

$$|k \neq m; i \neq j; k, m \in \{1, \ldots, N\}; i \in \{1, \ldots, n_k\}; j \in \{1, \ldots, n_m\}\}$$

$$D_w = \frac{1}{N} \cdot \sum_{c=1}^{N} \max\{d(x_i^c, x_j^c) | i, j \in \{1, \ldots, n_k\}\}$$

$$r = \frac{D_b}{1 + D_w}$$

where n is the overall number of elements in the space (total number of images), N is the number of clusters, $n_k$ is the number of elements in cluster k, k=1, 2, . . . , N, d(x,y) is the Euclidean distance between vectors x and y.

Using limited return dynamics, $$\rho_a(r) = \frac{r}{a+r},$$

with a being a parameter whose value is to be chosen such that it imposes a reasonable speed of growth on $\rho_a$. The halfway value of $\rho_a$, $\rho_a(a)=\frac{1}{2}$, is where for r=a half of the maximum possible quality intensity has been measured. The limited return dynamics grows fairly linearly and then bends to approach 1. Until intensity $\frac{1}{2}$, the dynamics is close to linear yielding a good candidate for the halfway value when r reaches a maximum value and r is limited. However, r can grow indefinitely or clusters can be arbitrarily far apart. Instead, r is bounded by good clustering criteria. $D_b \leq D_w$ should not occur because two clusters satisfying that condition would never be separated by a clustering approach. As such, $D_b > D_w$. Qualitatively good clustering is defined by $D_b \geq 2 \cdot D_w$ where $$r = \frac{2 \cdot D_w}{1 + D_w},$$

or $$r = \frac{2}{\frac{1}{D_w} + 1} \leq 2.$$

Finally, a=2 is the halfway value and the cluster quality formula becomes $$\rho_2(r) = \frac{r}{2+r}.$$

The second feature affecting the usefulness of the selected algorithm and data features is search efficiency. The search efficiency measure is the expected number of search steps a probe has to exhaust in order to find the desired picture or sample. The reciprocal of the step number is a measure for the efficiency with which a clustering can be searched.

$$w = \frac{1}{N + \frac{1}{N} \cdot \sum_{c=1}^{N} |C_c| + \frac{1}{n} \cdot \sum_{i=1}^{n} |P_{\vec{f}_i}|}$$

where $C_c$ is a cluster c, c=1, 2, ..., N and $P_x$ is the set of pictures in element x, $0 \leq w \leq 1$. Within this formula, the only entity changing is N since $$\sum_{i=1}^{n} |P_{\vec{f}_i}|$$

is the number of all pictures in the database and $$\sum_{c=1}^{N} |C_c|$$

is the number of all feature vectors which are constant. Every variable can be computed a priori except for the number of clusters. The search efficiency depends on the number of clusters if it is measured within a picture database with one fixed set of feature vectors.

Analogous to the cluster quality, limited return dynamics yields a measure for the search efficiency intensity. To calculate the halfway value, the derivative of $$f(x) = \frac{1}{x + \frac{1}{x} \cdot c + b}$$

with regard to x provides $x=\sqrt{c}$ as a maximum for f(x). The largest value for w is attained when $$N = \sqrt{\sum_{c=1}^{N} |C_c|}.$$

The smallest value for f(x) is attained when x=0, because $$f(0) = \frac{1}{x + \frac{1}{x} \cdot c + b}\bigg|_{x=0} = \frac{x}{x^2 + c + b \cdot x}\bigg|_{x=0} = 0.$$

As such, $$w_{max} = \frac{1}{2 \cdot \sqrt{\sum_{c=1}^{N} |C_c|} + \frac{1}{n} \cdot \sum_{i=1}^{n} |P_{\vec{f}_i}|}.$$

Because the original measure is not limited, supremum of x, $x_{sup}$, provides $$y = \frac{2 \cdot x}{x_{sup} + x}.$$

Finally, $$\pi(w) = \frac{2 \cdot w}{w_{max} + w}$$

where $\pi$ is a measure for the search efficiency.

The name search result quality yields a measure of quality from the results by an image feature vector search. The person names associated with each feature vector within the gallery or search space have associated names or targets. The produced confusion is utilized to calculate precision and recall values.

$$m = \frac{1}{M} \cdot \sum_{k=1}^{M} \left( \frac{1}{N} \cdot \sum_{i=1}^{N} F_{k,i} \right),$$

where the F-Score is $$F_{k,i} = \frac{2 \cdot recall_{k,i} \cdot precision_{k,i}}{recall_{k,i} + precision_{k,i}},$$

and where $$recall_{k,i} = \frac{\# TP_{k,i}}{\# TP_{k,i} + \# FN_{k,i}},$$

and $$precision_{k,i} = \frac{\# TP_{k,i}}{\# TP_{k,i} + \# FP_{k,i}}.$$

$$\# TP_{k,i} = \sum_{d=1}^{|C_i|} \#_{x_k}^{f_d}$$

$$\# FP_{k,i} = \sum_{d=1}^{|C_i|} \sum_{j=1}^{M} \#_{x_j}^{f_d} - \# TP_{k,i},$$

$$\# TN_{k,i} = n - \sum_{d=1}^{|C_i|} \sum_{j=1}^{M} \#_{x_j}^{f_d} - \left| \sum_{i=1}^{n} \#_{x_k}^{f_d} \right| + \# TP_{k,i},$$

$$\# FN_{k,i} = n - \sum_{d=1}^{|C_i|} \sum_{j=1}^{M} \#_{x_j}^{f_d} - \# TN_{k,i}$$

$X = \{x_1, x_2, \ldots, x_M\}$ is the set of names; $\#_x^f$=Number of occurrences of name x in feature vector f; $S_{x_k}$ the set of feature vectors with name $x_k$; $\#TP_{k,i}$ is the number of true occurrences of the k-th name in the i-th cluster; $\#FP_{k,i}$ is the number of false occurrences of the k-th name in the i-th cluster; $\#TN_{k,i}$ is the number is true occurrences of the k-th name outside of the i-th cluster; $\#FN_{k,i}$ is the number of false occurrences of the k-th name outside of the i-th cluster.

Clearly m is between 0 and 1. Limiting return dynamics is used to standardize the score. The maximum possible value for m is 1, which is, for example, always the case when M=1. Finally, the name search result quality function is $$\lambda(w) = \frac{2 \cdot m}{1 + m}.$$

A fitness function measures the performance of individuals relative to each other. The measure of overall performance can be based on several independent dimensional quantities. For example, in nature an individual of a species might be selected for size, parenting skills, ability to cooperate, and fur length. Each of the features is utilized within a fitness function that comprehends the diverse qualities. Within the perpetual analytics system 10, such a fitness function combines the cluster quality, search efficiency, and name result quality measures for a given cluster space. Recall that the instructions for the creation of the cluster space have been decoded from a chromosome. The combined metric provides a fitness score for the chromosome.

The creation of a final fitness function involves three consolidation steps. First, a common scale is imposed on each of the quantity measures. Within the system, a quantity is absent or present with an associated unlimited magnitude. The common scale is within the interval [0,1] or within the range of 0 to 100%. Second, the unlimited magnitude is mapped to a limited range [0,1] such that each quantity has been normalized to the same range. A limiting return dynamics function provides a limit on measures. Algebraically, the simplest form of limiting return is given by $$y = \frac{x}{a+x},$$

where x is the originally measured quantity, and a is the value of that quantity x for which the term y becomes ½. The choice of a determines how fast y is growing as x increases. The variable a is a rescaling parameter which can be used to normalize diverse quantity measures even if the ranges of quantities are vastly different. The second consolidation step consists of finding for each measure the proper value of its parameter a. If the original measure is not unlimited the supremum $x_{sup}$ of the possible x values and use $$y := \frac{2 \cdot x}{x_{sup} + x}$$

is used. Lastly, relative weights of each metric encode a contribution to the overall fitness score.

The three fitness functions established are search space performance measures, so in order to establish a performance measure based on their combination we have to combine them via their harmonic mean.

We, therefore, define the final function $\phi(\Omega)$ as follows:

$$\varphi(\Omega) := \frac{3}{\frac{1}{\rho_2(r_\Omega)} + \frac{1}{\pi(w_\Omega)} + \frac{1}{\lambda(m_\Omega)}}.$$

Since $\rho_2(r_\Omega), \pi(w_\Omega), \lambda(m_\Omega) \in [0,1]$, each of the reciprocals is $\geq 1$, and so the sum of those reciprocals is $\geq 3$, guaranteeing that $\phi(\Omega) \in [0,1]$ as well.

If we want to weigh fitness measures differently, we can extend the final fitness function as follows:

$$\varphi_{\alpha,\beta}(\Omega) := \frac{3}{\frac{1}{\alpha \cdot \rho_2(r_\Omega)} + \frac{1}{\beta \cdot \pi(w_\Omega)} + \frac{1}{(1-\alpha-\beta) \cdot \lambda(m_\Omega)}},$$

where $0 \leq \alpha \leq 1$, $0 \leq \beta \leq 1$, and $0 \leq \alpha + \beta \leq 1$.

Analogously to before we conclude that $\phi_{\alpha,\beta}(\Omega) \in [0,1]$ since $\alpha \cdot \rho_2(r_\Omega) \in [0,a] \cap [0,1]$, $\beta \cdot \pi(w_\Omega) \in [0,\beta] \cap [0,1]$, and $(1-a-\beta) \cdot \lambda(m_\Omega) \in [0,(1-a-\beta)] \cap [0,1]$, which again means that the sum of their reciprocals is $\geq 3$.

Algorithms

Classification algorithms are defined by the structure of data to be processed and the behavior as to how the data should be processed. From data structure, classifiers follow a strict taxonomy. At the first level, a classifier can be either exclusive or overlapping. If each object belongs to one class, the classification is exclusive. However, if cluster sets are not disjoint, the classifier becomes overlapping. The cluster creation process is either intrinsic or extrinsic. An algorithm is considered intrinsic if a proximity or feature matrix is solely used to learn classes within data. However, data labels or targets indicate that an extrinsic measure will produce clusters. Intrinsic is commonly known as unsupervised learning while extrinsic is synonymous with supervised learning. K-means clustering is an example of an exclusive and intrinsic algorithm while C-means clustering is an overlapping and intrinsic implementation. Decision or classification trees are examples of extrinsic clustering. A third division within the taxonomy for exclusive and intrinsic algorithms include hierarchical and partitional. Hierarchical clustering is a chain of partitions where each ply or hierarchy level is a partition.

Following data structure decisions, classification algorithms have several differing behaviors for the processing data. Within any classification algorithm, any number of features can be selected at any iteration. A monothetic algorithm will use one data feature at a time. For example, within hierarchical clustering, a set of partitions might use the first feature while the following set select the second feature.

Alternatively, the use of all data features during classification is referred to as polythetic. Data feature processing helps to guide an algorithm to decide to merged or split a class or cluster. Class splitting is referred to as divisive while merging is called agglomerative. If all data begins within one class, the method will divide the least correlated data into separate class(es). However, agglomerative behavior initializes a cluster for each data object and merges like objects into classes. As new classes are formed, the center of the space can be updated after all data elements have been grouped, parallel, or after a single data element has been grouped, serial.

TABLE 2

$$C_1 = \begin{cases} \text{Taxonomy: exclusive, intrinsic, hierarchical} \\ \text{Behavior: agglomerative, serial, polythetic} \end{cases}$$

$$D_p(Cl_{ik}, Cl_{ik+1}) = D_1(Cl_{ik}, Cl_{ik+1})$$

$$C_2 = \begin{cases} \text{Taxonomy: exclusive, extrinsic, hierarchical} \\ \text{Behavior: divisive, parallel, monothetic} \end{cases}$$

CHAID = {significance, Pearson}

A typical hierarchical clustering is implemented as described in table 2. The algorithm belongs to the exclusive, intrinsic, and hierarchical taxonomy while maintaining agglomerative, serial, and polythetic behavior. A hierarchical level or cluster space, $C_n$, is defined by a series of partitions, $P_{ni}$. Each cluster, $Cl_{ik}$, belongs to th ith partition and contains the lth data member, $$x_{ikl} \in Cl_{ik} \in P_{ni}; i \geq 0; k \geq 0; l \geq 0; n \geq 0,$$

that is the kth cluster. The intersection of two clusters, $$Cl_{ik} \cap Cl_{i(k+l)} = \Phi,$$

produces an empty set because the data elements belong to one and only cluster. The hierarchical clustering algorithm either stops when all of the data elements are merged into a cluster or when a halting criterion is reached.

Figure 10:
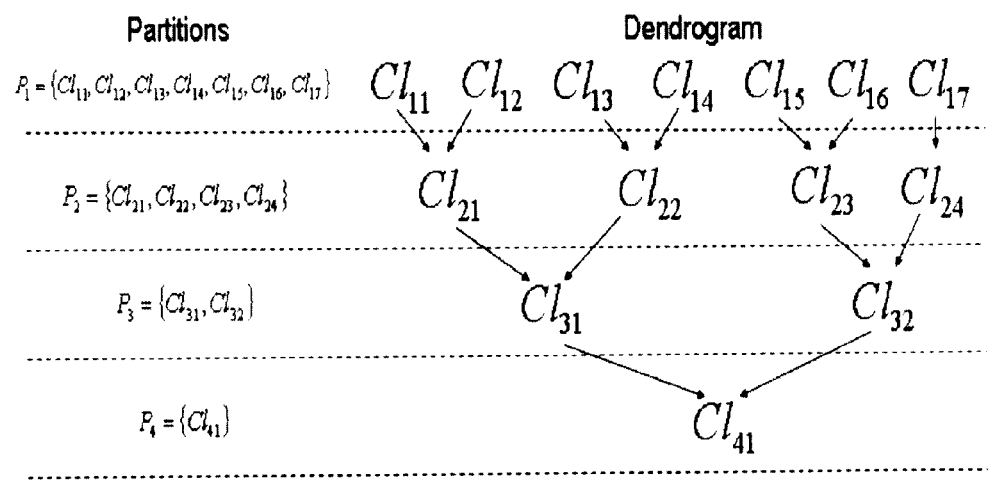
FIG. 10 shows a merging of data elements according to an embodiment of the invention.
Figure 11:
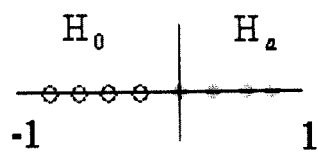
FIG. 11 shows classifications according to null and alternate hypotheses according to an embodiment of the invention.

The dendrogram depicted in FIG. 10 shows the merging of data elements. The decision of which clusters to merge at a partition level is determined by a purity or similarity metric calculation, $$D_p(Cl_{ik}, Cl_{ik+1}).$$

Two commonly used cluster similarity measures utilize the single link or complete link scores. The single link determines the minimum, $D_p$, pairwise distances between two clusters. The complete link selects the maximum distance, $D_p$, of all pairwise points between two clusters. Both algorithms run in O(m*n) between two clusters. The single link is more versatile such that it can extract concentric circles from a cluster space. However, the clusters created by complete link are more compact. Even with the PubFig database reduced and correlated into 32 features, the feature space is highly complex. As such, the single link implementation captured any feature vector landscape, including concentric circles. After the $D_p$ metric is calculated between each cluster, the pair with minimum $D_p$ within the similarity matrix is merged. According to Anderberg, the proximity indices calculated by $D_p$ must satisfy:

a) $D_p(Cl_{ik}, Cl_{ik+1}) \geq 0, \forall k, k+1$ b) Dissimilarity: $D_p(Cl_{ik}, Cl_{ik}) = 0, \forall k$ c) Similarity $D_p(Cl_{ik}, Cl_{ik}) \geq \max D_p(Cl_{ik}, Cl_{ik+1}), \forall k, k+1$ d) $D_p(Cl_{ik}, Cl_{ik-1}) = D_p(Cl_{ik-1}, Cl_{ik}), \forall k, k+1$ The similarity function implements a Cartesian distance metric. Within binary space, the Cartesian distance and Hamming distance are equivalent. However, given a clustering threshold greater than 0, the epicenters of the resulting clusters will not be within binary space. With the introduction of continuous variables within the epicenter of clusters, Cartesian distance provides a continuous variable as output. The following equation depicts a Hamming distance measure within binary space and a Cartesian function for all other values.

$$D_1(Cl_{ik}, Cl_{ik+1}) = \begin{cases} \sum_k Cl_{ik} \oplus \sum_k Cl_{ik+1}; \forall y_{ik} \in \{1,0\}; \forall y_{ik+1} \in \{1,0\} \\ \sum_k \sqrt{Cl_{ik} - Cl_{ik+1}}^2; \forall y_{ik}, y_{ik+1} \notin \{1,0\} \end{cases}$$

The variable y is an element within the centroid of a cluster.

TABLE 3

Agglomerative Heirarchical Clustering pseudo code.
Agglomerative Hierarchical Clustering A priori define $\{|C|, D(C_{px}, C_{py})\}$
AHClustering 0: Apply the chromosome, $c_x$, projection to each data sample
AHClustering 1: Retrieve |C| from semi-supervised training
AHClustering 2: Merge the two closest samples as measured by $D(C_{px}, C_{py})$
AHClustering 3: if $|C| \geq |C_p|$ then goto step 2
AHClustering 4: Return dendrogram structure
AHClustering 5: Select the last partition from the dendrogram structure A second classification algorithm, a version of a decision tree, is implemented within the system. The decision tree uses a growing method such as Chi-squared Automatic Interaction Detection (CHAID), Classification and Regression Trees (CRT), and etc. to create a tree-based classification model. The model creates groups or predicts values of a target based on predictor variables. The decision tree is a form of supervised learning since the target variables are defined a priori. Typically, decision trees are used for prediction, segmentation, stratification, data reduction, and grouping. Traditionally, each branch or node within the tree is represented by a decision rule. The decision rule is also a cut in space or classification process. The decision tree space forms a loose type of clustering space so that homogeneous clusters are formed.

Based on known work, the decision tree algorithm was altered to produce a clustering algorithm. Within the context of problem analytics, the cluster space should be produced from sets of selected feature vectors. To achieve such an algorithm, the decision tree pre and post processing was modified. Despite the alterations, the tree algorithm is still devisive, monothetic, and nonoverlapping.

The pre-processing of the data creates the a priori targets based on selected data features. Each of the data element's feature vector was projected by the chromosome onto a resulting feature space. The feature space for each data element will contain, at most, the original number of traits. After each data element has produced a projection, the target values are created. Target values are either non-existing points, $P_{ne}$, or existing points, $P_e$. A non-existing point means that after a feature projection, the resulting set is not within the data set. An existing point is defined by the existence of a feature vector within the data set. Every record within the data set has a target value of $P_{ne}$ or $P_e$. The number of tree levels is dependent on the list of features to be used.

After the construction of the tree cluster space, all of the tree terminals or leaf nodes are collected as clusters. A two step approach smoothes the cluster space: Pruning $\min_e$ specifies the minimum number of existing points that must be present within a cluster to survive where $a_{\%}$ is a percentage threshold.

$$\min_e = |P_e| * a_{\%}$$

Merging $\min_{dist}$ determines the minimum distance between clusters before they are to be joined where h is the schema order and $b_{\%}$ is a percentage threshold.

$$\min_{dist} = h * b_{\%}$$

The overall algorithm is found in table 4.

TABLE 4

Decision Tree Clustering pseudo code.
Decision Tree Clustering (breadth method)

A priori define $\{G_m, \alpha_{\%}, b_{\%}\}$
DTClustering 0: Apply the chromosome, $c_x$, projection to each data sample
DTClustering 1: Label targets $P_e$ or $P_{ne}$
DTClustering 2: Initial growing method $G_m$
DTClustering 3: Select attribute $a_i$ from $\bar{a}$
DTClustering 4: Create children nodes for each node on current tree level
DTClustering 5: if $i \leq |\bar{a}|$ then $a_i = a_{i+1}$ goto step 3
DTClustering 6: Create cluster space with all leaf nodes
DTClustering 7: Prune clusters with $\min_e$
DTClustering 8: Merge clusters with select $\min_{dist}$ Within the perpetual analytic system 10, the Euclidean distance is utilized with all similarity matrix computations. However, within binary space, the Cartesian measure is equivalent to the Hamming measure. As such, the use of a Hamming distance metric within binary space while implementing the Cartesian metric for all others is equivalent as implementing the Euclidean measure for all domains. Even though the Hamming distance is ideal for comparing binary vectors, which are the feature encodings for the PubFig dataset, the metric does not have the concept of a mean vector.

A centroid for a cluster is a mean vector of data elements. The genetic algorithm fitness function weights a cluster efficiency metric that relies on mean vectors. As a result, the Euclidean measure was chosen. Even so, the Euclidean measure of distance is equivalent to the Hamming measure of difference on bitwise comparisons.

Let two binary vectors $X=(x_1, \ldots, x_n)$ and $Y=(y_1, \ldots, y_n)$ be given, which means that $x_i, y_i \in \{0,1\}$ for $i=1, \ldots, n$. Then the formula for the Hamming Distance $H(X,Y)$ is as follows:

$$H(X, Y) = \sum_{i=1}^{n} (1 - I_{\{x_i\}}(y_i)),$$

where $$I_{\{x_i\}}(y_i) = \begin{cases} 1 & \text{if } x_i = y_i \\ 0 & \text{if } x_i \neq y_i \end{cases} \text{ for } i = 1, \ldots, n.$$

This formula can, in the case of $x_i, y_i \in \{0,1\}$ for $i=1, \ldots, n$, be translated into $$H(X, Y) = \sum_{i=1}^{n} |x_i - y_i| \tag{13}$$

The formula for the Euclidean Distance $D(X,Y)$ is:

$$D(X, Y) = \sqrt{\sum_{i=1}^{n} (x_i - y_i)^2}$$

Since $|x_i - y_i|$ is either 0 or 1 for $i=1, \ldots, n$, we obtain that $|x_i - y_i| = (x_i - y_i)^2$, and so the Euclidean Distance becomes in the binary case:

$$D(X, Y) = \sqrt{\sum_{i=1}^{n} |x_i - y_i|}$$

which means that $H(X,Y) = D(X,Y)^2$.

The Euclidean Distance can be used in binary space instead of the Hamming Distance when comparing vectors while also supporting constructs such as the mean vector, which in general is not a vector in binary space, but whose components show the proportions of 1s of all the binary vectors that contribute to the mean. The Euclidean distance formula accepts of any mean vector where the Hamming Distance Formula would not produce distance measures. Formula (13) can be applied to vectors which are not in binary space, however, the implementation would not be the Hamming Distance.

Each of the photos is described by 73 features obtained by attribute classifiers. All 73 attributes from each image was reduced to 33. Each attribute type, not value, is encoded onto a chromosome as a gene. A chromosome allel is in the set $\{1,0\}$. The 0 value means to exclude the attribute from a system iteration while 1 is inclusive. From equation x, a feature vector, $\bar{\mu}$, is masked with a chromosome, c.

$$f(\bar{u}, c_x) = \bar{u}'$$

$\bar{u} = (1, \text{Gender}, \text{Ethnicity}, \ldots, \text{Generation})$ $c_x = (1, 0, 1, \ldots 0)$ $\bar{u}' = (1, \text{null}, \text{Ethnicity}, \ldots, \text{null})$ The resulting feature vector is a subset of the original feature vector. Each distinct chromosome patterns select a unique set of features. A chromosome with length 33 has $2^{33}$ possible combinations or possible translations into feature sets. Table 5 is an enumeration of all 33 features.

TABLE 5

Gender, Attractive, Generation, Haircolor, Hairtype,
Hasrecedinghairline, Hasbangs, Forehead, Hassideburns,

TABLE 5-continued

Eyeweartype, Facialhair, Expression, Facetype,
Hasstrongnosemouthlines, Hasflushedface, Hasroundjaw,
Ischubby, Hahighcheekbones, Eyebrows, Eyes, Hasbrowneyes,
Nosetype, Hasbiglips, Mouthstate, Isteethvisible, Hashat,
Makeup, Skintype, Hasrosycheeks, Hasearring, Hasnecktie, Hasnecklace Data Preprocessing: Dimensionality Reduction and Variable Selection The science of data analytics includes the analysis of data for the generation of insights resulting with predictive decisions. As data becomes more complex and heterognous, data analysis becomes intractable. The unsustainability of data complexity is known as the curse of dimensionality. Such high data feature space requires an increasing amount of computational cycles. As dimensionality increases, algorithms on the high feature space become computationally intense. As a result, two general classes of dimensionality reduction techniques along with variable selection methods are implemented within data analytics.

The first class of dimensionality reduction include lossy algorithms that project features into a lower dimensional space. The projection truncates the remainder such that the data cannot be recovered. For example, Principal Component Analysis (PCA) is a lossy compression algorithm that discards data that has a low impact on the overall datagram. The operation is noninvertible such that the original source cannot be retrieved. An example of an application of PCA is with the Joint Photographic Experts Group (JPEG) recognized by the International Organization of Standardization (ISO). With each successive application of the compression algorithm, the data becomes fuzzier. Data loss is not a problem as long as:
 a) Principle components overwhelm nonessential dimensions
 b) The original data source is not required
 c) Data loss does not effect hypothesis testing Secondly, lossless algorithms apply patterns or statistical models to data that maps the source into a lower dimensional space. The combination of the mapping and resulting data is smaller than the original. However, the algorithm is invertible so that the original data can be preserved. Many wavelet compression or ensemble combinations of algorithms provide lossless or near lossless steps.

Jointly or independent of dimensionality reduction, variable selection chooses which variables to include during analysis. Statistical methods become overwhelmed with an increase number of observations and the number of features within each observation. Each variable of an observation defines a single dimension. Statisticians utilize the term variable or attribute while computer scientists identify with the term feature. Several statistical methods for attribute selection include the Pearson Correlation Coefficient, t-test and other anomaly detection metrics. Even though computer science and statistical language has counterparts, dimensionality reduction and variable selection are very different.

Complimentary, variable selection performs well on non correlated data while dimensionality reduction is suitable for highly correlated data. Both methods can be combined for attribute or feature selection. Dimensionality reduction techniques are best used to rank correlation. Attribute selection is optimal for choosing informative features.

Through both dimensionality reduction and attribute selection methods, the Perpetual Problem Analytic System implements the Pearson correlation, significance testing, and continuous variable thresholding to simplify the data. All of the continuous variables were reduced to 0, absent, or 1, present, values. Of the 73 reduced attributes for each person photograph within the PubFig dataset, 33 attributes were selected to be encoded onto a chromosome.

People Dataset

The embodiment, people parsing, of problem analytics required a set of labeled images that contained enough detail for feature extraction. Several person centric databases are available within the public domain. The PubFig dataset contains 58,797 images of 200 people. Alternatively, a much shallower dataset called Labeled Faces in the Wild (LFW) contains over 13,000 images of over 5,700 people. Both the PubFig and LFW utilize existing images selected from the web and are split within a combination of training, validation and testing sets. Each of the LFW samples is labeled with a person name through a manual process. However, LFW did not have benchmarked attribute or features such as pose, clothing, gender, etc. associated with each picture. A third dataset by Carnegie Mellon University called the Pose Illumination and Expression (PIE) dataset contained 41,368 images of 68 people. The dataset is very deep and contains 60 feature descriptions. However, the images were acquired in a controlled setting.

Unlike PIE, PubFig contained people images from any type of environment. Further contrary to LFW, PubFig has 73 attributes obtained from feature classifiers. The authors of PubFig utilized Amazon's Mechanical Turk, a crowd sourcing labor market, to label the attributes of each person. Each photo was submitted to three people for voting. The PubFig paper provides the accuracy of each classifier. As a result, the PubFig dataset provides a good compromise between a person deep and wide dataset within a natural acquisition with many extracted image features. The PubFig development contains 60 people with 16,336 images with the evaluation set comprised of 140 people with 42,461 images.

Person traits from the PubFig database were discovered by attribute classifiers. The knowledge discovery process of person traits has been called People Parsing or attribute based people search. Kumar et al. applied 73 attribute classifiers to the entire 60,000 facial samples of the PubFig dataset. The classifier training data was obtained from crowd sourcing photographs to the Mechanical Turk. The labor cloud produced over 6.5 million inputs from 3 different people. Only the labels in which all 3 labelers agreed were retained. The mean accuracy of the classifiers is 84.09% while the variance was 0.006, which is very good on faces found on the internet.

The classification score is on the continuous interval [−1,1]. Attributes with a score s≥0 accepts the alternate hypothesis, $H_a$, while s<0 accepts the null hypothesis $H_0$. The null hypothesis claims that the classifier is not correct while the alternative hypothesis supports the contrary. The linear classifier of s=0 reduces the continuous attributes into $H_0$ or $H_a$ classes.

Variable Selection

Each of the 73 variables describe features of a given photograph. Several of the features belong to the same class type such as generation. An individual must be in an exclusive category such as Baby, Child, Youth, Middle Aged or Senior. A person cannot be both a Baby and a Senior. However, to determine groups of variable classes, attribute states were aggregated. Category such as hair color, skin type, gender, generation, facial expression and eye wear type quickly formed. A few cases were ambiguous such as hair type. Could a person have both curly and wavy hair? To resolve non-obvious state relationships, the r-score or the Pearson Correlation Coefficient indicates correlation.

$$r = \frac{\text{cov}_{s,y}}{s_x s_y} = \frac{\sum_{i=1}^{n}(X_i - \overline{X})(Y_i - \overline{Y})}{\sqrt{\sum_{i=1}^{n}(X_i - \overline{X})^2 \sum_{i=1}^{n}(Y_i - \overline{Y})^2}}, r \in [-1, 1] \quad (14)$$

From Equation 14, a covariance matrix was formed with $$\sum_{i=1}^{n}(X_i - \overline{X})(Y_i - \overline{Y}).$$

The denominator of the calculation multiplied each variable's standard deviation denoted as $s_x$ and $s_y$ respectively. The Pearson Correlation value will be in the interval $r \in [-1,1]$. A score of 1 proves that the two variables are perfectly and positively correlated. Alternatively, an r-score of −1 means the two variables are perfectly and negatively correlated. A percentage indicator of correlation is found by squaring the r-score. Table 6 summarizes common statistical r-score meanings. Within the context of people attributes, the r-score provided empirical evidence of attribute states.

TABLE 6 r-score interpretation [3, 7]

| % Agreement | Pearson Correlation Coefficient | Category |
|---|---|---|
| [100%, 49%] | r ∈ [1, 0.7] | Perfect to Strong Positive |
| (49%, 16%] | r ∈ (0.7, 0.4] | Moderate Positive |
| (16%, 9%] | r ∈ (0.4, 0.3] | Weak Positive |
| (9%, 9%) | r ∈ (0.3, −0.3) | Weak to Negligible |
| [9%, 16%) | r ∈ [−0.3, −0.4) | Weak Negative |
| [16%, 49%) | r ∈ [−0.4, −0.7) | Moderate Negative |
| [49%, 100%] | r ∈ [−0.7, −1] | Perfect to Strong Negative |

Equally important is the significance test or 2-tailed t-test on the r-score. The significance tests provided the probability that an r-score could occur given the facial dataset. The hypothesis testing space is summarized with equations 15.

$$\begin{cases} H_0: r = 0 \\ H_a: r \neq 0 \end{cases} \quad (15)$$

The degrees of freedom, from equation 16, of the two tailed test provide N−2 choices of which to place data. Following equation 17, the t-score is related to both degrees of freedom and the r-score. Any t-test score less than 0.05 is significant, which rejects the null hypothesis.

$$df = N - 2 \quad (16)$$

$$t = \frac{r\sqrt{N-2}}{\sqrt{1-r^2}} \quad (17)$$

The confidence of attaining an r-score is another test that proved of importance. The z-score of every r-score was calculated. A z-score centers all of the data around 0 with a standard deviation of 1. Equation 18 achieves the z-score from the r-score.

$$z_r = \frac{1}{2}\log_e\left(\frac{1+r}{1-r}\right) \quad (18)$$

Each z-score's standard error was the standard deviation, s, divided by the square root of the samples. The standard error is an input parameter for the calculation of the 95% confidence interval as shown in equations 20 and 22. The 1.96 value is determined from a z-score table that can be found in any statistical text book. Equation 21 is utilized to compute the r-score given the z-score to find the r-score confidence interval.

$$SE_{z_r} = \frac{s}{\sqrt{N}} = \frac{1}{\sqrt{N}} \quad (19)$$

$$P(z_r - (1.96 * SE_{z_r}) \leq z_r \leq z_r + (1.96 * SE_{z_r})) = 95\% \quad (20)$$

$$f(z_r) = r = \frac{e^{(2z_r)} - 1}{e^{(2z_r)} + 1} \quad (21)$$

$$P(f(z_r) \leq r \leq f(z_r)) = 95\% \quad (22)$$

Selected Variables and Features

Figure 9A:
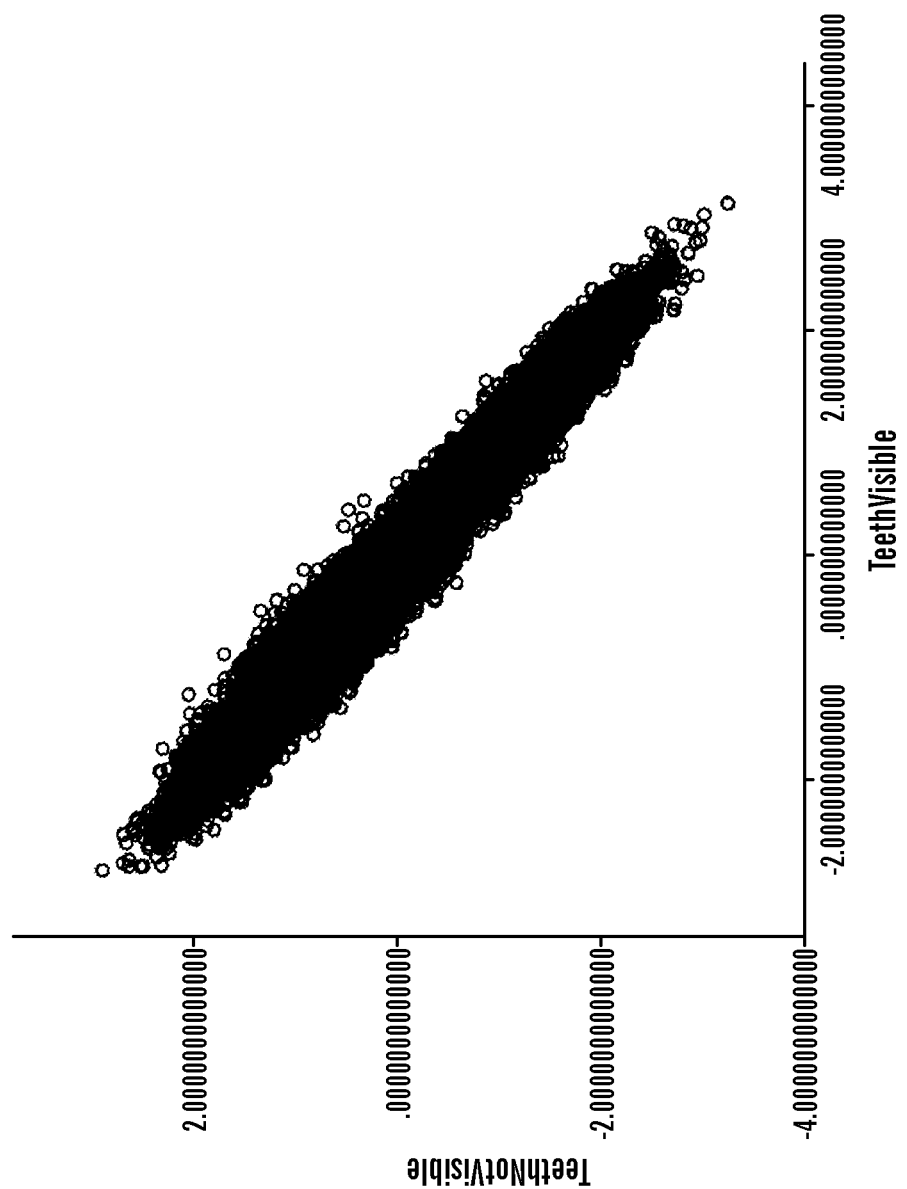
FIGS. 9 a-c depicts scatter plots of data correlations in accordance with an embodiment of the invention.
Figure 9B:
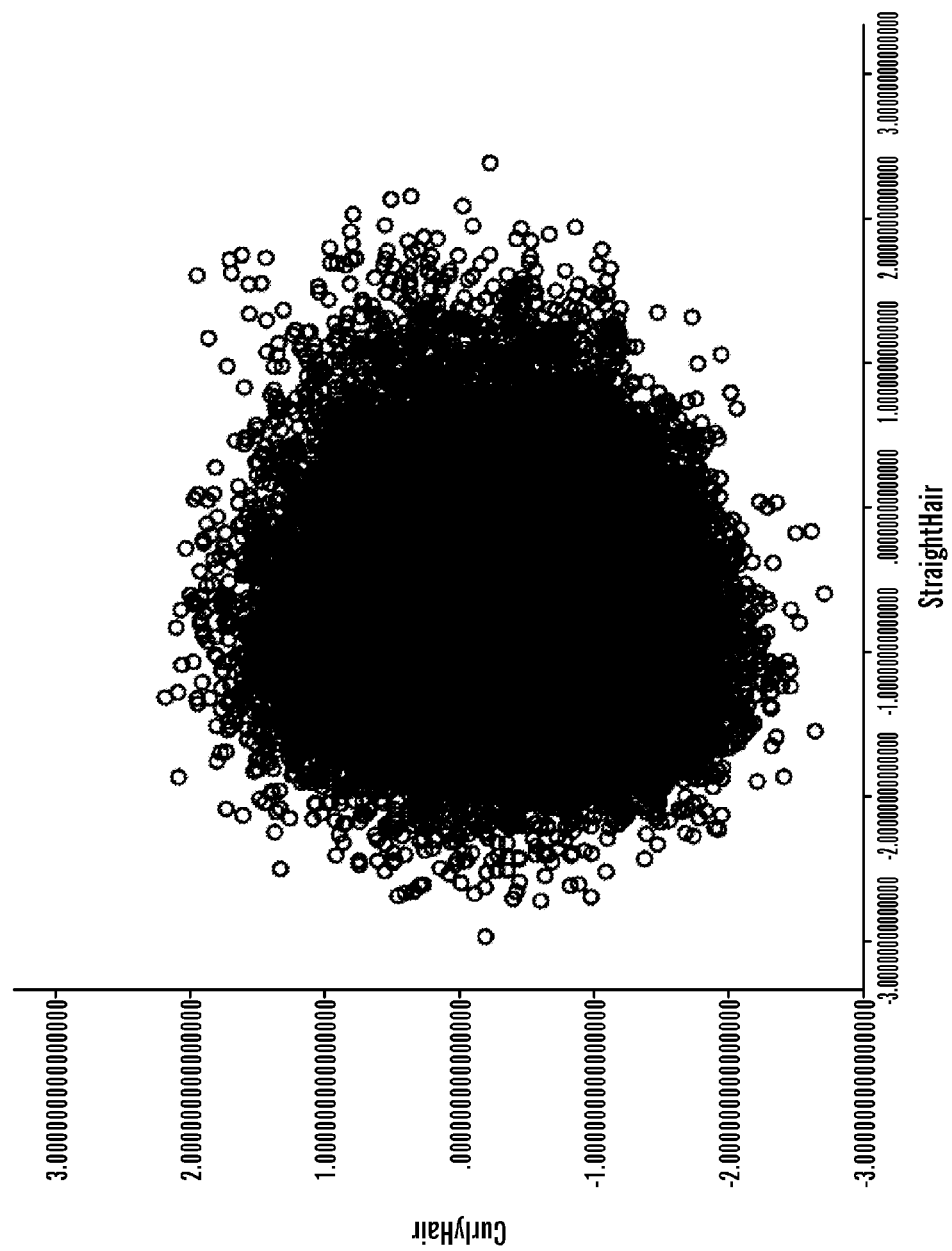
Figure 9C:
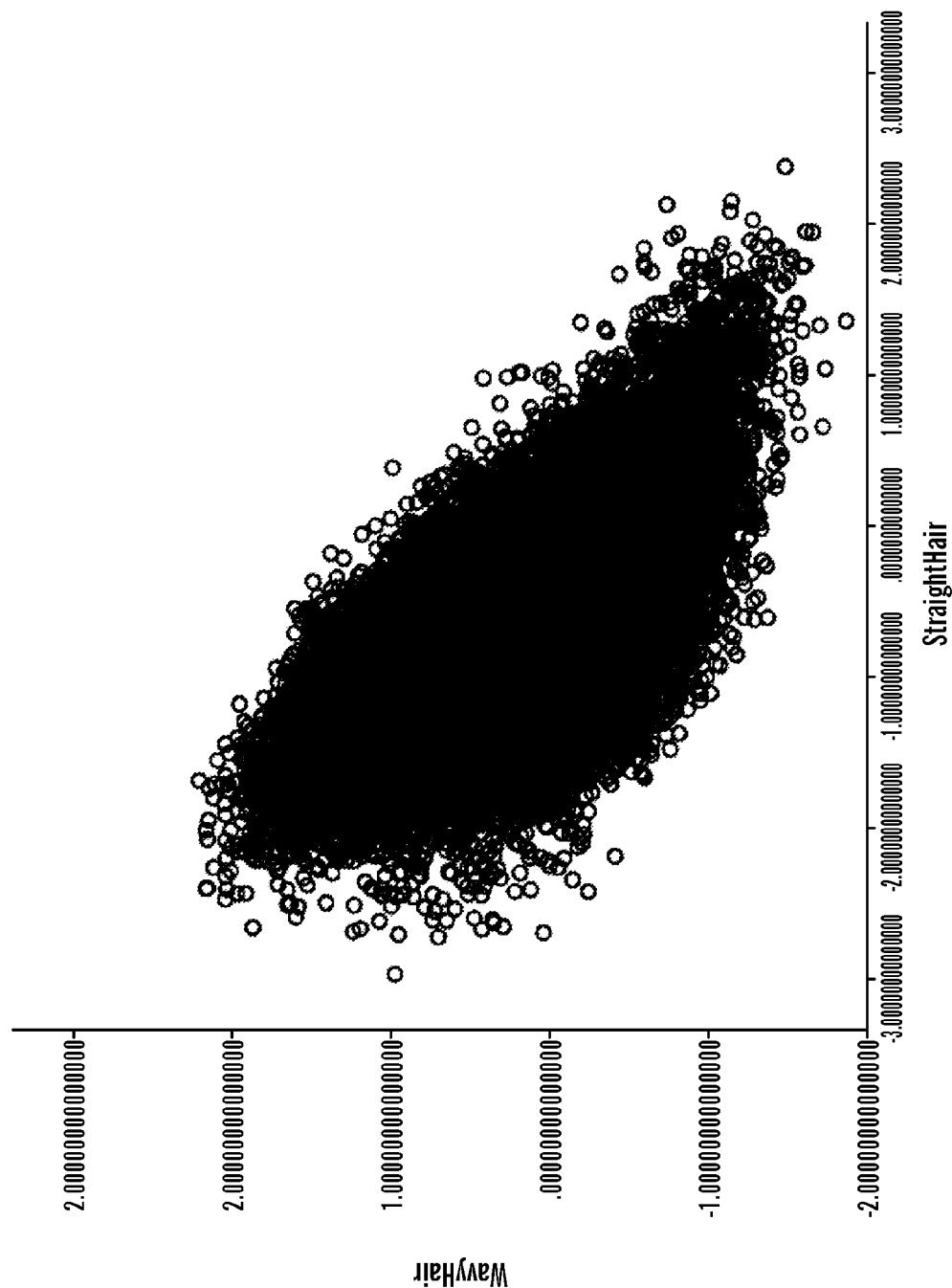

Variable selection and dimensionality reduction techniques was a two step process for data simplification. The data preprocessing reduces the search space of the perpetual analytic system such that several data feature and variable combinations are pruned. Prior and expert domain knowledge about a specific problem is utilized to logically group variables that could be states of a class. Scatter plots shown in FIG. 9a, 9b, 9c provide quick data visualization for obvious correlations. Graph 1 (9a) shows a highly linear relationship between teeth not visible and teeth being visible. In this example, the teeth variable classification appears to be disjoint. However, within Graph 2 (9b), Curly Hair and Straight Hair are not highly correlated. As a third example, graph 3 (9c) depicts that Wavy Hair and Straight Hair are moderately linearly correlated. The first steps of including a priori experiment knowledge and applying scatter plots to potentially correlated variables reduced the full $$\sum_{k=1}^{N}\binom{73}{k}$$

possible combinations to $$\sum_{k=1}^{N}\binom{32}{k}.$$

Tables 7 and 8 depict Pearson Correlation and 2-tailed Significance testing for two candidate variable classes: Teeth and Hair Type. Clearly, the two teeth attributes for Teeth are extremely negatively correlated with an r-score of −0.986. The significance is virtually 100% for the alternate hypothesis or agreeing with the r-score. In addition, the Teeth variable r-score is within the 95% confidence interval.

TABLE 7

Teeth Variable Correlation Matrix [IBM SPSS]
Correlations

|  |  | TeethNotVisible | TeethVisible |
|---|---|---|---|
| TeethNotVisible | Pearson Correlation | 1 | −.986** |
|  | Sig. (2-tailed) |  | .000 |
|  | N | 42879 | 42879 |
| TeethVisible | Pearson Correlation | −.986** | 1 |
|  | Sig. (2-tailed) | .000 |  |
|  | N | 42879 | 42879 |

**Correlation is signifcant at the 0.01 level (2-tailed).

$$z_r = \frac{1}{2}\log_e\left(\frac{1-0.986}{1+0.986}\right) = -2.18 \tag{11}$$

$$SE_{z_r} = \frac{s}{\sqrt{N}} = \frac{1}{\sqrt{42879}} = 0.005 \tag{12}$$

$$P(-2.190 \le z_r \le -2.170) = 95\% \tag{13}$$

$$P(-0.9862 \le r \le -0.9856) = 95\% \tag{14}$$

For the Hair Type class, the r-score showed that the attribute Curly Hair was not, at minimum, moderately correlated with either Wavy or Straight Hair, with −0.164 and 0.045 respectively. The attribute Curly Hair was hoisted out of the Hair Type class and moved into an independent class. However, Wavy Hair and Straight Hair were combined as attributes for the Hair Type class. Both r-score confidence interval scores are calculated from equations 17 and 19.

TABLE 8

Hair Type Variable Correlation Matrix
Correlations

|  |  | CurlyHair | WavyHair | StraightHair |
|---|---|---|---|---|
| CurlyHair | Pearson Correlation | 1 | −.164** | .045** |
|  | Sig. (2-tailed) |  | .000 | .000 |
|  | N | 42879 | 42879 | 42879 |
| WavyHair | Pearson Correlation | −.164** | 1 | −.648** |
|  | Sig. (2-tailed) | .000 |  | .000 |
|  | N | 42879 | 42879 | 42879 |
| StraightHair | Pearson Correlation | .045** | −.648** | 1 |
|  | Sig. (2-tailed) | .000 | .000 |  |
|  | N | 42879 | 42879 | 42879 |

**Correlation is significant at the 0.01 level (2-tailed).

$$z_r = \frac{1}{2}\log_e\left(\frac{1+0.045}{1-0.045}\right) = -0.045$$

$$SE_{z_r} = \frac{s}{\sqrt{N}} = \frac{1}{\sqrt{42879}} = 0.005$$

$$P(-0.0545 \le r \le 1.746) = 95\%$$

$$z_r = \frac{1}{2}\log_e\left(\frac{1-0.648}{1+0.648}\right) = -0.7718$$

$$P(-0.6534 \le r \le -0.3392) = 95\%$$

After the variables were selected from a priori data soure knowledge, scatter plots and statistical analysis, dimensionality reduction produced features. Within a class such as Hair Type, the attribute with highest classification score was kept as the attribute feature. Equation 20 depicts the equation for all or nothing. If a class had only 1 attribute, the feature became Boolean.

$$\sum_{i=0}^{N} \max(X_i) = \text{feature} \tag{23}$$

The total 73 features was grouped and reduced to 35 attributes

System Training

The Perpetual Problem Analytic System utilizes supervised and unsupervised training techniques resulting with an overall semi supervised approach. Algorithm parameters are trained on half of the training data while the feature and algorithm selectors learn from the remaining data.

Semi Supervised Algorithm Threshold Training

Clustering algorithms require few input parameters that must be determined a priori. For example, K Means clustering is a powerful and efficient pattern classification technique. The term K must be defined before the start of clustering. Alternatively, a proximity score and threshold can be used to dynamically determine the number of clusters during clustering. Hierarchical clustering contains levels of partitions with varying cluster numbers. The halting criteria is defined by a threshold on member proximity scores. As such, the final partition level of a hierarchical clustering dendrogram is determined by a threshold value that translates to a cluster number.

A semi-supervised learning approach was taught using the overall fitness function found above. The cluster quality metric is unsupervised such that external knowledge about the samples are not required. Both the search efficiency and name search result quality require labels within the data. The metrics are a form of supervised learning. By mixing an unsupervised or non labeled data and supervised or labeled data metrics together, the overall fitness is a form of semi supervised learning. Traditional agglomerative hierarchical clustering follows continue to iterate until more than one cluster is present. Within semi-supervised trained hierarchical clustering, the final step checks a halting condition or the acceptable maximum number of clusters. The semi-supervised training approach is described in table 9.

TABLE 9

Semi Supervised Training steps.
Semi Supervised Training

A priori define $\{\Delta, \sigma_{min}, \sigma_{max}\}$
Training 1: $\tau = \sigma_{min} + \Delta$
Training 2: Select features encoded by a chromosome
Training 3: Cluster the training set according to threshold $\tau$
Training 4: Compute the overall fitness $\phi_a(\Omega)$ and a new threshold $\tau = \sigma_{min} + \Delta$
Training 5: if $\tau \le \sigma_{max}$ go to step 1
Training 6: select $f(\max(\phi_a)) = \{\tau_b, \kappa_b\}$ $\tau$ = threshold, $\sigma_{min}$ = lower bound, $\sigma_{max}$ a = upper bound, $\Delta$ = step size, $\kappa_b$ = cluster number The semi-supervised training approach was run on each chromosome that encodes features and algorithms. The training data was split into two independent sets separate sets to be used for hierarchical threshold training and overall chromosome ranking SPSS provided the mechanism for the training data division. Prior works such as provide the foundations of the approach.

Semi-Supervised Fitness Training

The overall semi-supervised genotype training is outlined in table 10.

TABLE 10

Semi Supervised Chromosome Training steps
Semi Supervised Chromosome Training

A priori define $\xi$, the GA Schema
Training 1: Initialize population
Training 2: Select a chromosome, $c_x$
Training 3: Mask each data feature vector, $u_n$, with chromosome, $c_x$
Training 4: Create a phenotype with algorithm, $a_y$
Training 5: Compute the overall fitness $\phi_a(\Omega)$
Training 6: Go to step 2 for all x chromosomes
Training 7: Apply $\xi\{s_p\}$, $\xi\{p_m\}$, and $\xi\{p_c\}$ to chromosome population
Training 8: Go to step 2 if generation number, $g \leq \xi\{g\}$
Training 9: Return the fittest chromosome or best of set features and an algorithm $\xi$ = GA Schema, $c_x$ = chromosome, $u_n$ = data feature vector, $a_y$ = algorithm, $\phi_a(\Omega)$ = overall fitness, $s_p$ = selection pressure, $p_m$ = mutation probability, $p_c$ = crossover probability, g = generation number.

Half of the training data was utilized within the entire genotype learning process. Both labeled and non-labeled data was within the training set. The result of table 10 produces a recommendation of a set of features and an algorithm to apply to a problem.

Results—Semi Supervised Algorithm Threshold Learning

The hierchical clustering maximum number of clusters threshold was trained on a subset of labeled development data from PubFig. SPSS Statistics split the development dataset approximately in half with random sampling. A set of parameters establishes the search space proximity matrix range and a step function to evaluate possible cases. A maximum, $D_{max}$, and minimum, $D_{min}$, Cartesian proximity measure between clusters was specified a priori. Within the algorithm, the maximum proximity measure of possible clusters is equal to l where all gene positions are different between a pair of chromosomes. Whereas, the minimum score is 0, which implies equality. Since the smallest increase of $D_i$ to $D_{i+1}$ is 1, the step size for all possible thresholds between $Cl_{max}$ and $Cl_{min}$ is 1 resulting in l possible hierarchical thresholds. Each of the possible thresholds are applied to an agglomerative k-means clustering algorithm. After cluster convergence, the cluster space is measured with $\phi_a(\Omega) := a \cdot \rho_2(r_\Omega) + \beta \cdot \pi(w_\Omega) + (1-a-\beta) \cdot \lambda(m_\Omega)$ from equation.

Both the final cluster space score $\phi_a(\Omega)$ and the number of clusters are retained. After all possible l steps, the corresponding cluster number for the highest scored cluster space is returned as the |C| halting criteria. The algorithm is repeated for each chromosome since the projection of each unique chromosome creates different spaces. The number of clustering runs is determined by l*n.

According the space fitness evaluation score, the halting criteria |C| is selected. Clearly, by optimizing on $\phi_a(\Omega)$, the algorithm produces a compromise between the number of clusters and a selected threshold. As depicted herein, the threshold is equivalent to the Hamming distance between chromosomes or the Cartesian distance in binary space.

Referring again to FIG. 1, it is understood that perpetual analytics system 10 may be implemented using any type of computing device (i.e., computer system). Such a computing device generally includes a processor, input/output, memory, and a bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a perpetual analytics system 10 could be created, maintained and/or deployed by a service provider that offers the functions described herein for customers. That is, a service provider could offer to deploy or provide the ability to provide path information in a storage configuration as described above.

It is understood that in addition to being implemented as a system and method, the features may be provided as one or more program products stored on a computer-readable storage medium, which when run, enables a computer system to provide a perpetual analytics system. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A perpetual analytics system that provides a genetic algorithm for selecting an algorithm and feature set to solve a problem, comprising:
    a computing device including:
        an evolutionary computing engine for processing data encoded as chromosomes, wherein each chromosome encodes an algorithm and a feature set;
        a domain knowledge store that maintains a plurality of algorithms and a plurality of features;
        a system for applying a generation of chromosomes to a set of data to provide a set of results, the set of results including a set of phenotypes, wherein each chromosome of the set of chromosomes is translated into the set of phenotypes by applying the algorithm and the feature set; and
        a fitness function, based at least on a search efficiency using the set of phenotypes, for evaluating the set of results to rate a performance of each chromosome in the set of chromosomes;
        wherein the evolutionary computing engine is adapted to evolve a subset of the set of chromosomes into a new generation of chromosomes.

2. The perpetual analytics system of claim 1, wherein the evolutionary computing system comprises a Evolutionary Computing in Java (ECJ) infrastructure.

3. The perpetual analytics system of claim 1, wherein each chromosome is encoded as binary data.

4. The perpetual analytics system of claim 1, further comprising a training system.

5. The perpetual analytics system of claim 1, further comprising a system for determining a set of parameters for the genetic algorithm.

6. The perpetual analytics system of claim 1, further comprising:
    a system for implementing an exit criteria to stop evolving chromosomes; and
    a system for outputting a best algorithm and feature set to solve an inputted problem.

7. A method of selecting an algorithm and feature set to solve a problem, comprising:
    providing an initial generation of chromosomes, wherein each chromosome encodes an algorithm and a feature set;
    applying each chromosome from the initial generation of chromosomes to a set of data to provide a set of results, the set of results including a set of phenotypes, wherein each chromosome of the initial generation of chromosomes is translated into the set of phenotypes by applying the algorithm and the feature set;
    evaluating the set of results with a fitness function, based at least on a search efficiency using the set of phenotypes, to rate a performance of each chromosome in the initial set of chromosomes; and
    evolving a subset of chromosomes to creates a new generation of chromosomes.

8. The method of claim 7, wherein the initial set of chromosomes is determined based on a domain knowledge store.

9. The method of claim 7, wherein evolving a subset of chromosomes is implemented with an evolutionary computing engine.

10. The method of claim 7, further comprising:
    applying each chromosome from the new generation of chromosomes to the set of data to provide a new set of results;
    evaluating the new set of results with the fitness function to rate a performance of each chromosome in the new set of chromosomes;
    evolving a subset of chromosomes to creates a next generation of chromosomes; and
    repeating the applying evaluating and evolving steps until an exit criteria is met.

11. The method of claim 10, further comprising:
    outputting a best algorithm and feature set to solve the problem based on the performance of an associated chromosome.

12. The method of claim 7, further comprising determining a set of genetic algorithm parameters.

13. The method of claim 7, wherein the evolving is selected from a group consisting of: mutating, cross over, and reproduction.

14. A program product stored on a non-transitory computer readable storage medium for selecting an algorithm and feature set to solve a problem, comprising:
    program code for providing an initial generation of chromosomes, wherein each chromosome encodes an algorithm and a feature set;
    program code for applying each chromosome from the initial generation of chromosomes to a set of data to provide a set of results, the set of results including a set of phenotypes, wherein each chromosome of the initial generation of chromosomes is translated into the set of phenotypes by applying the algorithm and the feature set;
    program code for evaluating the set of results with a fitness function, based at least on a search efficiency using the set of phenotypes, to rate a performance of each chromosome in the initial set of chromosomes; and
    program code for evolving a subset of chromosomes to creates a new generation of chromosomes.

15. The program product of claim 14, wherein the initial set of chromosomes is determined based on a domain knowledge store.

16. The program product of claim 14, wherein evolving a subset of chromosomes is implemented with an evolutionary computing engine.

17. The program product of claim 14, further comprising:
    program code for applying each chromosome from the new generation of chromosomes to the set of data to provide a new set of results;
    program code for evaluating the new set of results with the fitness function to rate a performance of each chromosome in the new set of chromosomes;
    program code for evolving a subset of chromosomes to creates a next generation of chromosomes; and
    program code for repeating the applying evaluating and evolving processes until an exit criteria is met.

18. The program product of claim 17, further comprising:
    program code for outputting a best algorithm and feature set to solve the problem based on the performance of an associated chromosome.

19. The program product of claim 14, further comprising program code for determining a set of genetic algorithm parameters.

20. The program product of claim 14, wherein the evolving is selected from a group consisting of: mutating, cross over, and reproduction.

* * * * *